United States Patent
Chang et al.

(10) Patent No.: US 11,763,162 B2
(45) Date of Patent: Sep. 19, 2023

(54) DYNAMIC GRADIENT CALIBRATION METHOD FOR COMPUTING-IN-MEMORY NEURAL NETWORK AND SYSTEM THEREOF

(71) Applicant: NATIONAL TSING HUA UNIVERSITY, Hsinchu (TW)

(72) Inventors: Meng-Fan Chang, Taichung (TW); Wei-Hsing Huang, Hsinchu (TW); Ta-Wei Liu, Hsinchu (TW)

(73) Assignee: NATIONAL TSING HUA UNIVERSITY, Hsinchu (TW)

( * ) Notice: Subject to any disclaimer, the term of this patent is extended or adjusted under 35 U.S.C. 154(b) by 408 days.

(21) Appl. No.: 16/902,282

(22) Filed: Jun. 16, 2020

(65) Prior Publication Data
US 2021/0390415 A1 Dec. 16, 2021

(51) Int. Cl.
*G06N 3/084* (2023.01)
*G06F 7/544* (2006.01)
*G06N 3/063* (2023.01)
*G06N 3/04* (2023.01)

(52) U.S. Cl.
CPC .......... *G06N 3/084* (2013.01); *G06F 7/5443* (2013.01); *G06F 7/5446* (2013.01); *G06N 3/04* (2013.01); *G06N 3/063* (2013.01)

(58) Field of Classification Search
CPC .............................. G06F 7/5443; G06F 7/5446
See application file for complete search history.

(56) References Cited

U.S. PATENT DOCUMENTS

2017/0323197 A1* 11/2017 Gibson .................. G06N 3/063
2018/0046900 A1* 2/2018 Dally ................... G06F 9/30018

* cited by examiner

*Primary Examiner* — Michael D. Yaary
(74) *Attorney, Agent, or Firm* — CKC & Partners Co., LLC

(57) ABSTRACT

A dynamic gradient calibration method for a computing-in-memory neural network is performed to update a plurality of weights in a computing-in-memory circuit according to a plurality of inputs corresponding to a correct answer. A forward operating step includes performing a bit wise multiply-accumulate operation on a plurality of divided inputs and a plurality of divided weights to generate a plurality of multiply-accumulate values, and performing a clamping function on the multiply-accumulate values to generate a plurality of clamped multiply-accumulate values according to a predetermined upper bound value, and comparing the clamped multiply-accumulate values with the correct answer to generate a plurality of loss values. A backward operating step includes performing a partial differential operation on the loss values relative to the weights to generate a weight-based gradient. The weights are updated according to the weight-based gradient.

20 Claims, 21 Drawing Sheets

100

DYNAMIC GRADIENT CALIBRATION METHOD FOR COMPUTING-IN-MEMORY NEURAL NETWORK AND SYSTEM THEREOF

BACKGROUND

Technical Field

The present disclosure relates to a dynamic gradient calibration method and a system thereof. More particularly, the present disclosure relates to a dynamic gradient calibration method for a computing-in-memory neural network and a system thereof.

Description of Related Art

In these years, due to the industrial growth of mobile device, medical electrical equipment, portable storage, etc., requirement of memory with low power, high speed and high density is increased. Computation-in-Memory (CIM) is a promising solution to improve the energy efficiency of multiply-and-accumulate (MAC) operations for AI chips, and multiple-bit convolutional neural network (CNN) is required for high inference accuracy in many applications.

In the study of deep CNN accelerators, a CIM hardware is one of the accelerated computational units that accelerates the operation of CNN. The CIM hardware can support multiple input and multiplication of multiple memory values to get a partial sum, but the partial sum output through the memory unit is not full precision, so that calculation errors may occur, and these partial sums will be added up to obtain the final sum for the activation function. Once this phenomenon occurs, a prediction accuracy value of the CNN will be reduced. Therefore, a dynamic gradient calibration method for a computing-in-memory neural network and a system thereof having the features of reducing power consumption without affecting the accuracy of the CIM neural network are commercially desirable.

SUMMARY

According to one aspect of the present disclosure, a dynamic gradient calibration method for a computing-in-memory neural network is performed to update a plurality of weights in a computing-in-memory circuit according to a plurality of inputs corresponding to a correct answer. The dynamic gradient calibration method includes a forward operating step and a backward operating step. The forward operating step includes a bit wise multiply-accumulate step, a clamping step and a comparing step. The bit wise multiply-accumulate step includes dividing each of the inputs into a plurality of divided inputs, and dividing each of the weights into a plurality of divided weights, and performing a bit wise multiply-accumulate operation on the divided inputs and the divided weights to generate a plurality of multiply-accumulate values. The clamping step includes obtaining a predetermined upper bound value and a predetermined lower bound value, and performing a clamping function on the multiply-accumulate values to generate a plurality of clamped multiply-accumulate values according to the predetermined upper bound value and the predetermined lower bound value. Each of the clamped multiply-accumulate values is between the predetermined upper bound value and the predetermined lower bound value. The comparing step includes comparing the clamped multiply-accumulate values with the correct answer to generate a plurality of loss values. The backward operating step includes a partial differential operating step. The partial differential operating step includes performing a partial differential operation on the loss values relative to the weights to generate a plurality of weight-based gradients, and the weights are updated according to the weight-based gradients.

According to another aspect of the present disclosure, a dynamic gradient calibration method for a computing-in-memory neural network is performed to update a plurality of weights in a computing-in-memory circuit according to a plurality of inputs corresponding to a correct answer. The dynamic gradient calibration method includes a forward operating step and a backward operating step. The forward operating step includes a bit wise multiply-accumulate step, a clamping step, a quantization step and a comparing step. The bit wise multiply-accumulate step includes dividing each of the inputs into a plurality of divided inputs, and dividing each of the weights into a plurality of divided weights, and performing a bit wise multiply-accumulate operation on the divided inputs and the divided weights to generate a plurality of multiply-accumulate values. The clamping step includes obtaining a predetermined upper bound value and a predetermined lower bound value, and performing a clamping function on the multiply-accumulate values to generate a plurality of clamped multiply-accumulate values according to the predetermined upper bound value and the predetermined lower bound value, and each of the clamped multiply-accumulate values is between the predetermined upper bound value and the predetermined lower bound value. The quantization step includes performing a quantization function on the clamped multiply-accumulate values to generate a plurality of quantized multiply-accumulate values. The comparing step includes comparing the quantized multiply-accumulate values with the correct answer to generate a plurality of loss values. The backward operating step includes a partial differential operating step. The partial differential operating step includes performing a partial differential operation on the loss values relative to the weights to generate a plurality of weight-based gradients, and the weights are updated according to the weight-based gradients.

According to further another aspect of the present disclosure, a system of a dynamic gradient calibration method for a computing-in-memory neural network is configured to update a plurality of weights according to a plurality of inputs corresponding to a correct answer. The system includes a computing-in-memory circuit, a memory and a processor. The computing-in-memory circuit stores the weights and receives the inputs. The memory stores the correct answer. The processor is signally connected between the computing-in-memory circuit and the memory and configured to implement the dynamic gradient calibration method for the computing-in-memory neural network. The dynamic gradient calibration method for the computing-in-memory neural network includes a forward operating step and a backward operating step. The forward operating step includes a bit wise multiply-accumulate step, a clamping step, a quantization step and a comparing step. The bit wise multiply-accumulate step includes dividing each of the inputs into a plurality of divided inputs, and dividing each of the weights into a plurality of divided weights, and performing a bit wise multiply-accumulate operation on the divided inputs and the divided weights to generate a plurality of multiply-accumulate values. The clamping step includes obtaining a predetermined upper bound value and a predetermined lower bound value, and performing a clamping function on the multiply-accumulate values to generate a plurality of clamped multiply-accumulate values according to the predetermined upper bound value and the predetermined lower bound value, and each of the clamped multiply-accumulate values is between the predetermined upper bound value and the predetermined lower bound value. The quantization step includes performing a quantization function on the clamped multiply-accumulate values to generate a plurality of quantized multiply-accumulate values. The comparing step includes comparing the quantized multiply-accumulate values with the correct answer to generate a plurality of loss values. The backward operating step includes a partial differential operating step. The partial differential operating step includes performing a partial differential operation on the loss values relative to the weights to generate a plurality of weight-based gradients, and the weights are updated according to the weight-based gradients.

BRIEF DESCRIPTION OF THE DRAWINGS

The present disclosure can be more fully understood by reading the following detailed description of the embodiment, with reference made to the accompanying drawings as follows.

DETAILED DESCRIPTION

The embodiment will be described with the drawings. For clarity, some practical details will be described below. However, it should be noted that the present disclosure should not be limited by the practical details, that is, in some embodiment, the practical details is unnecessary. In addition, for simplifying the drawings, some conventional structures and elements will be simply illustrated, and repeated elements may be represented by the same labels.

It will be understood that when an element (or device) is referred to as be "connected to" another element, it can be directly connected to the other element, or it can be indirectly connected to the other element, that is, intervening elements may be present. In contrast, when an element is referred to as be "directly connected to" another element, there are no intervening elements present. In addition, the terms first, second, third, etc. are used herein to describe various elements or components, these elements or components should not be limited by these terms. Consequently, a first element or component discussed below could be termed a second element or component.

Before describing any embodiments in detail, some terms used in the following are described. A voltage level of "1" represents that the voltage is equal to a power supply voltage VDD. The voltage level of "0" represents that the voltage is equal to a ground voltage VSS. A PMOS transistor and an NMOS transistor represent a P-type MOS transistor and an N-type MOS transistor, respectively. Each transistor has a source, a drain and a gate.

Figure 1:
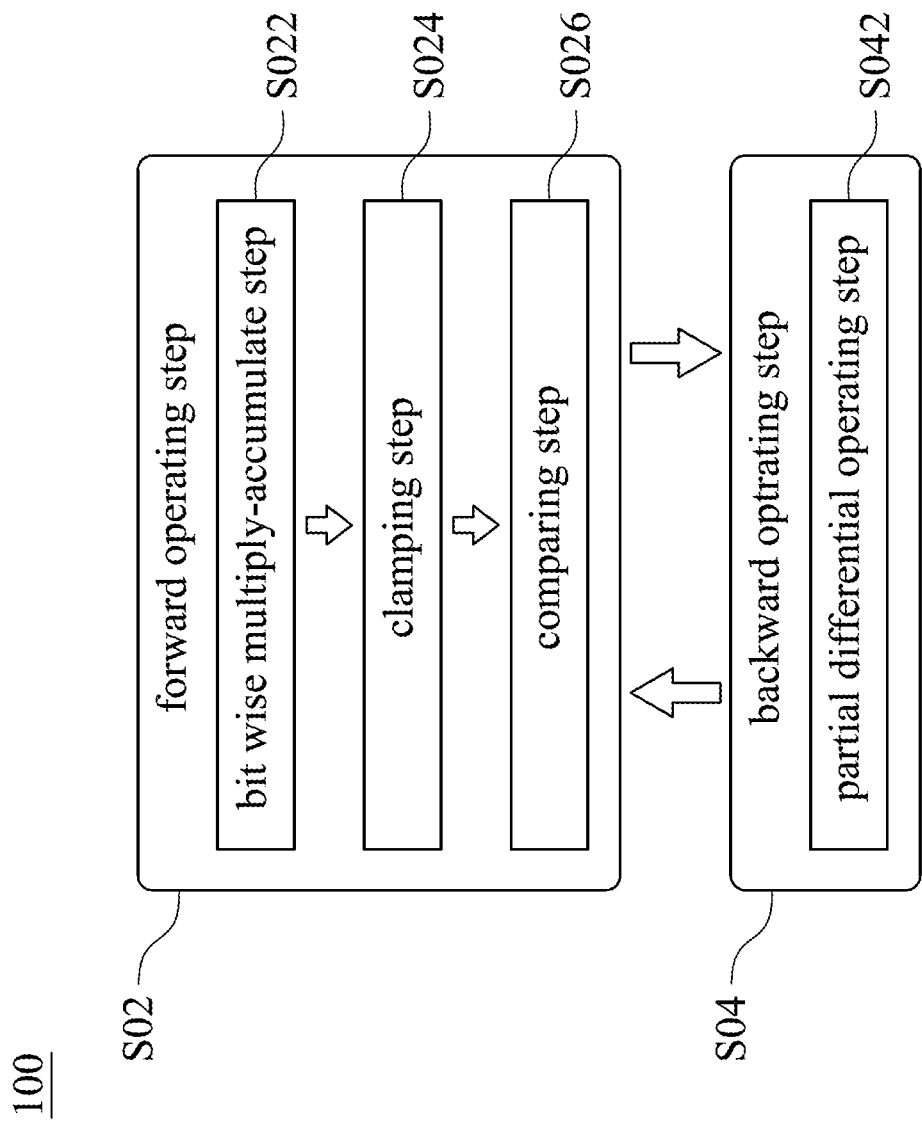
FIG. 1 shows a flow chart of a dynamic gradient calibration method for a computing-in-memory (CIM) neural network according to a first embodiment of the present disclosure.
Figure 2:
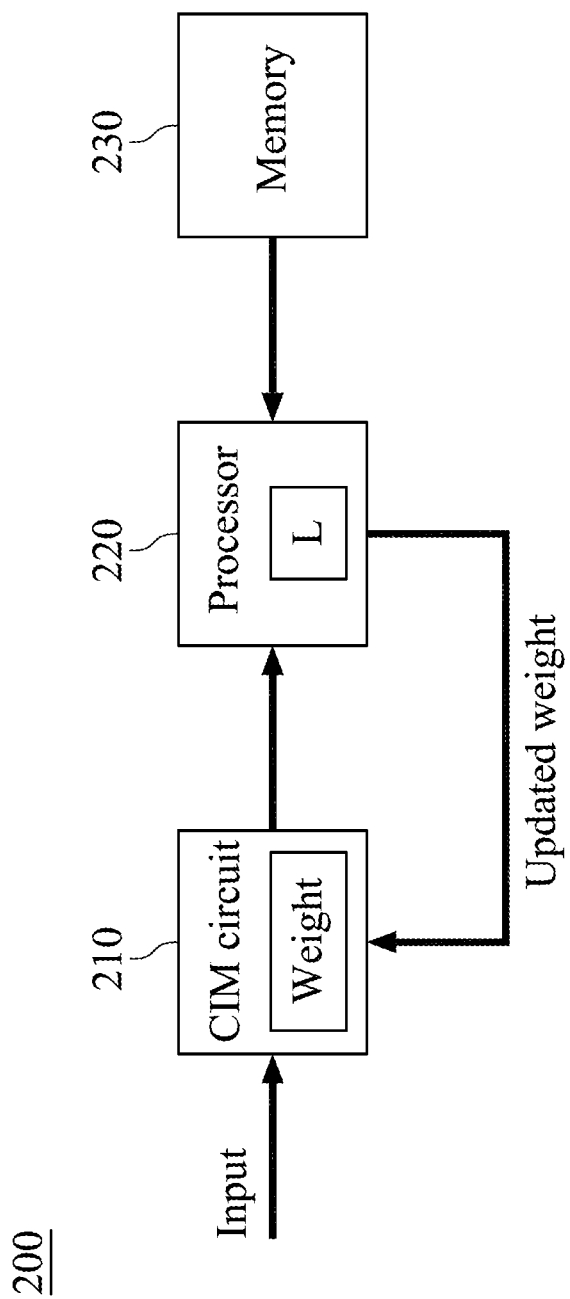
FIG. 2 shows a block diagram of a system of the dynamic gradient calibration method for the CIM neural network of FIG. 1.
Figure 3:
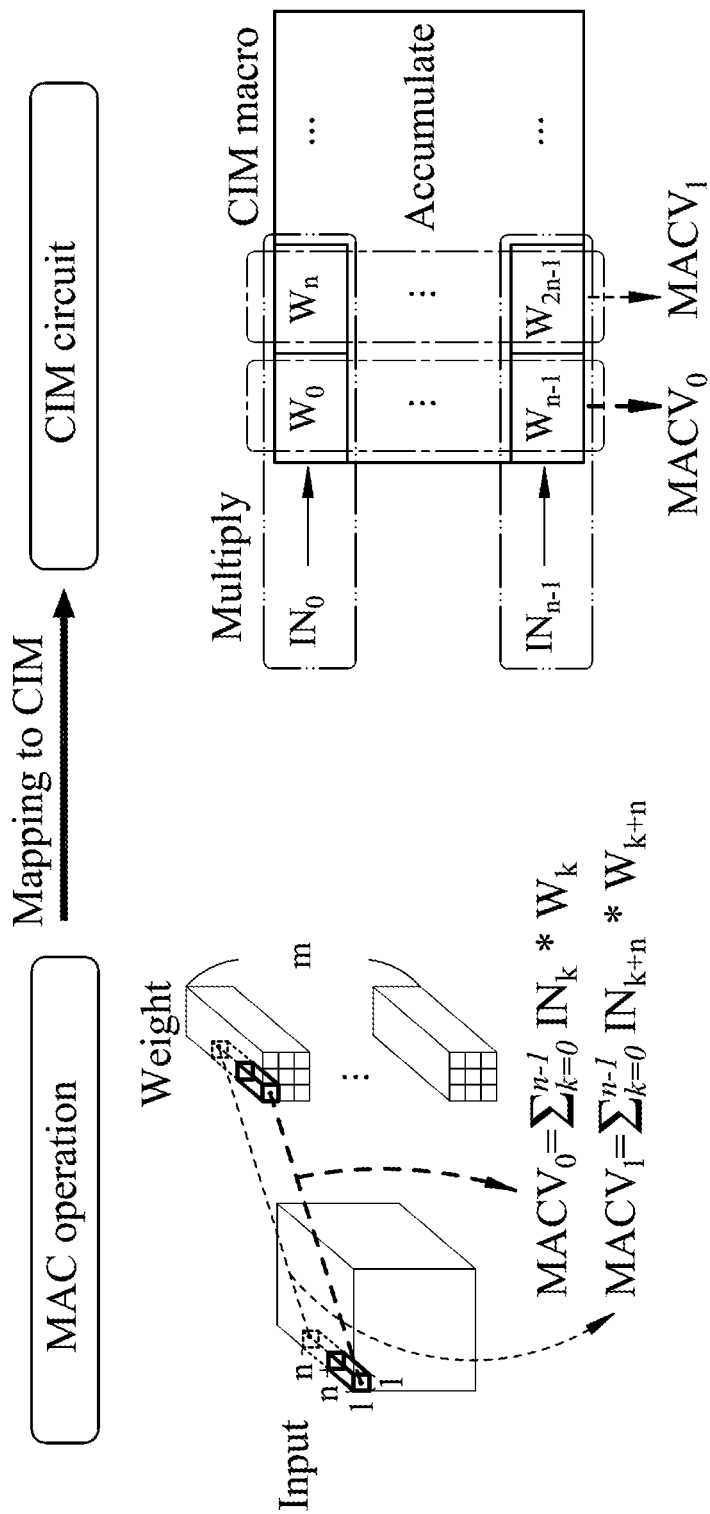
FIG. 3 shows a schematic view of a multiply-accumulate (MAC) operation mapping to a CIM circuit.
Figure 4:
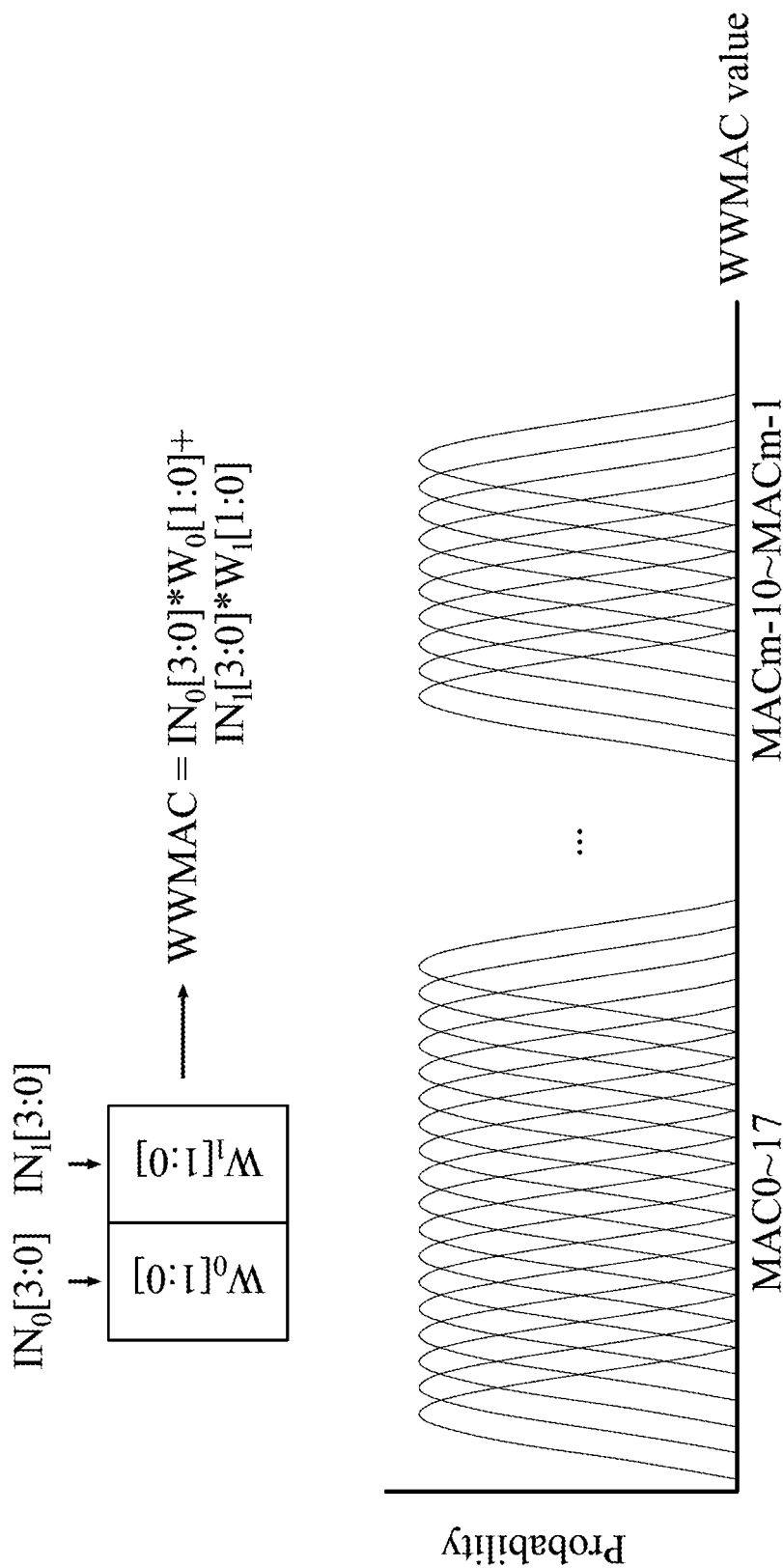
FIG. 4 shows a schematic view of a probability distribution of a word wise MAC operation with 4-bit inputs, 2-bit weights and 2-channel accumulations.
Figure 5:
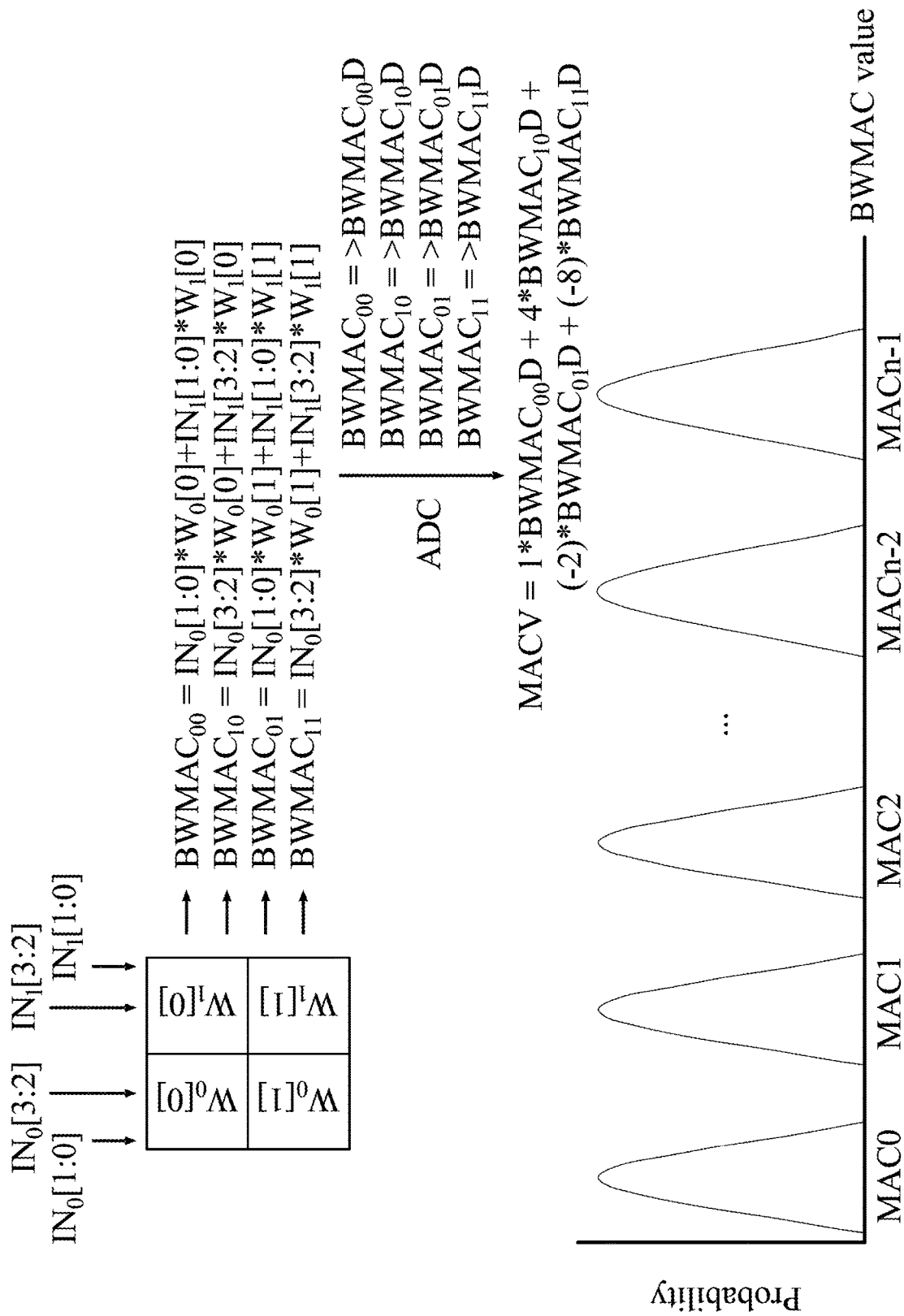
FIG. 5 shows a schematic view of a probability distribution of a bit wise MAC operation with 4-bit inputs, 2-bit weights and 2-channel accumulations.
Figure 6A:
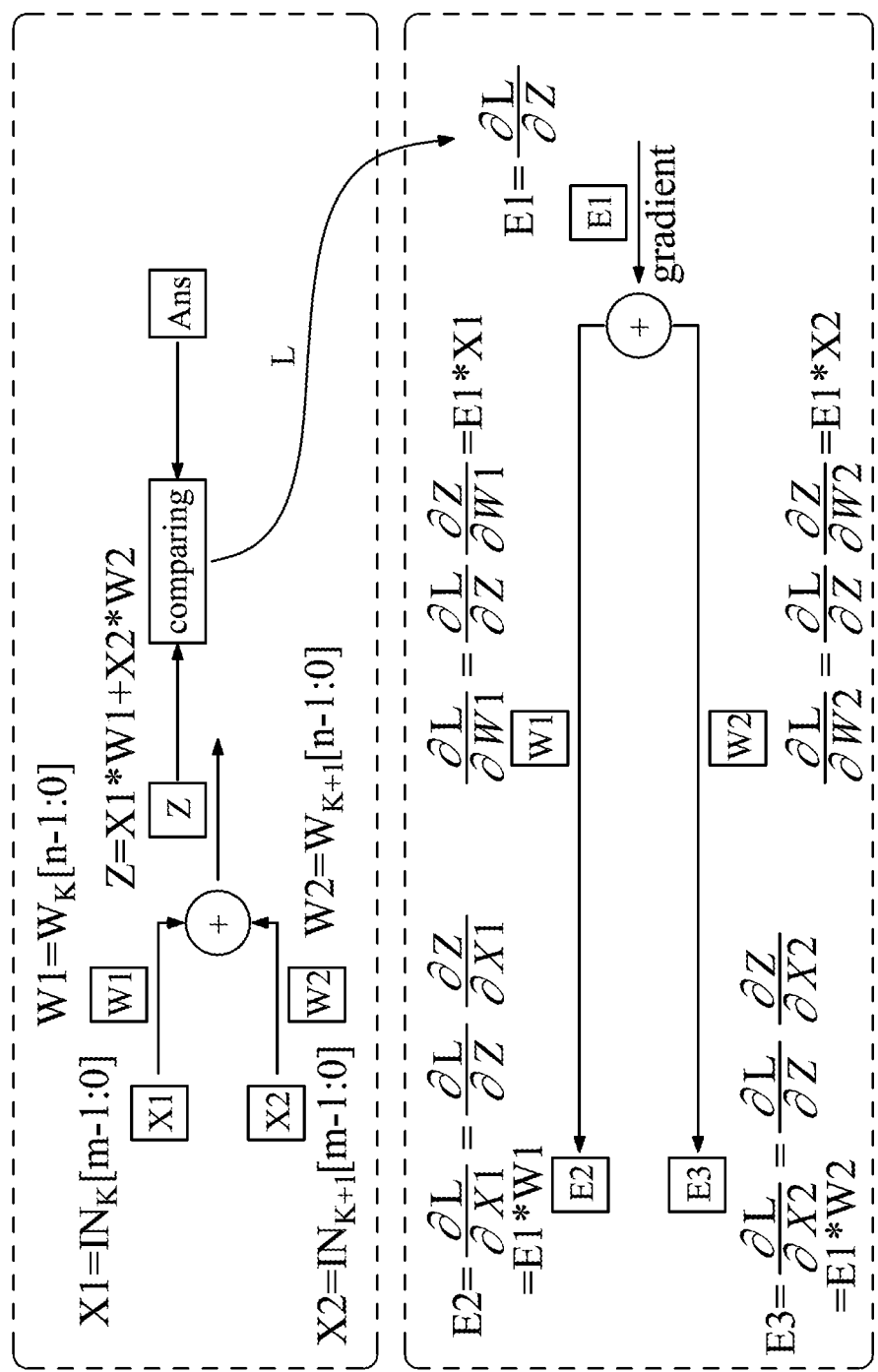
FIG. 6A shows a schematic view of a word wise forward propagation and a word wise backward propagation.
Figure 6B:
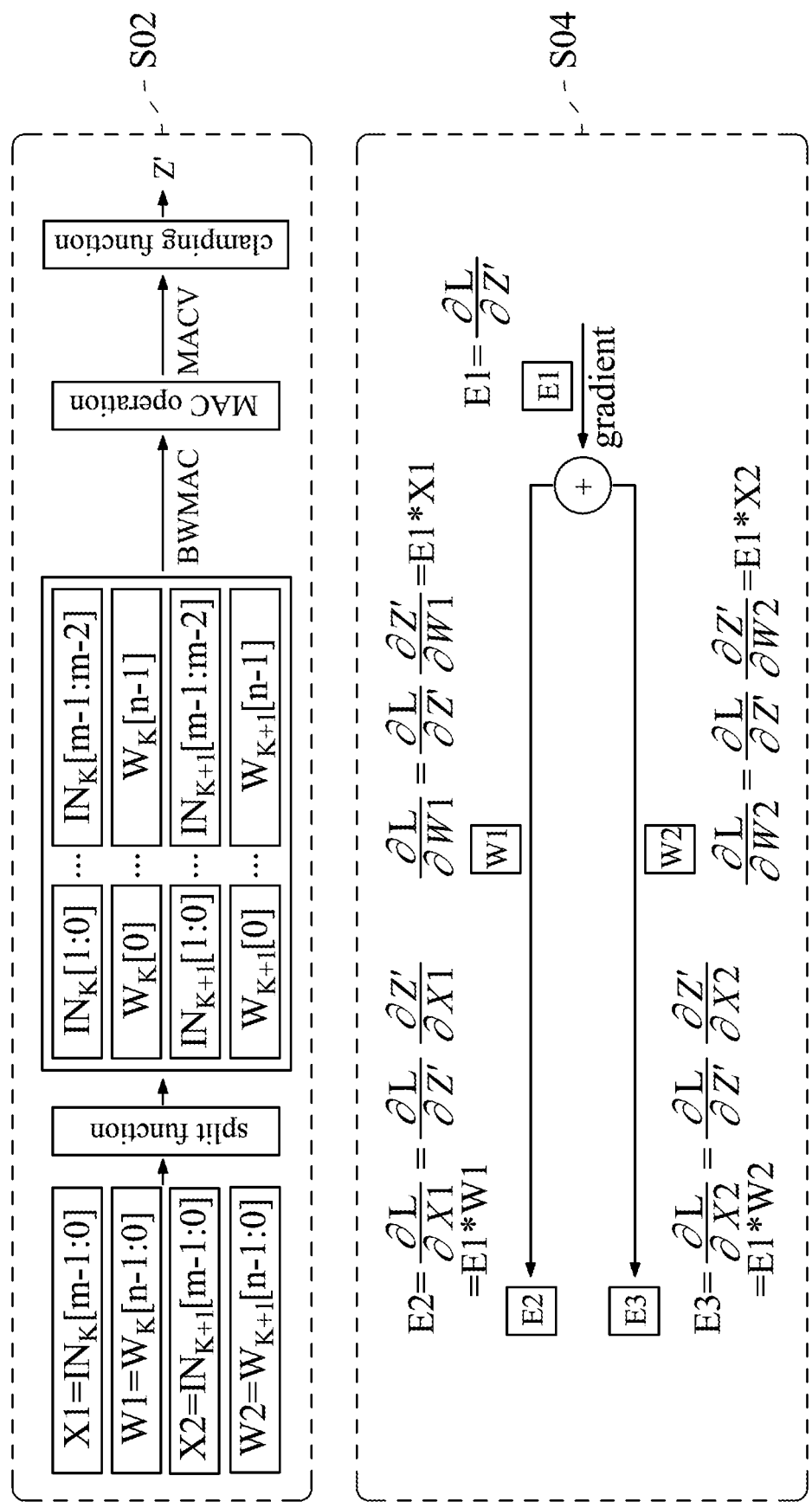
FIG. 6B shows a schematic view of a bit wise forward propagation and a word wise backward propagation of the dynamic gradient calibration method of FIG. 1.
Figure 7:
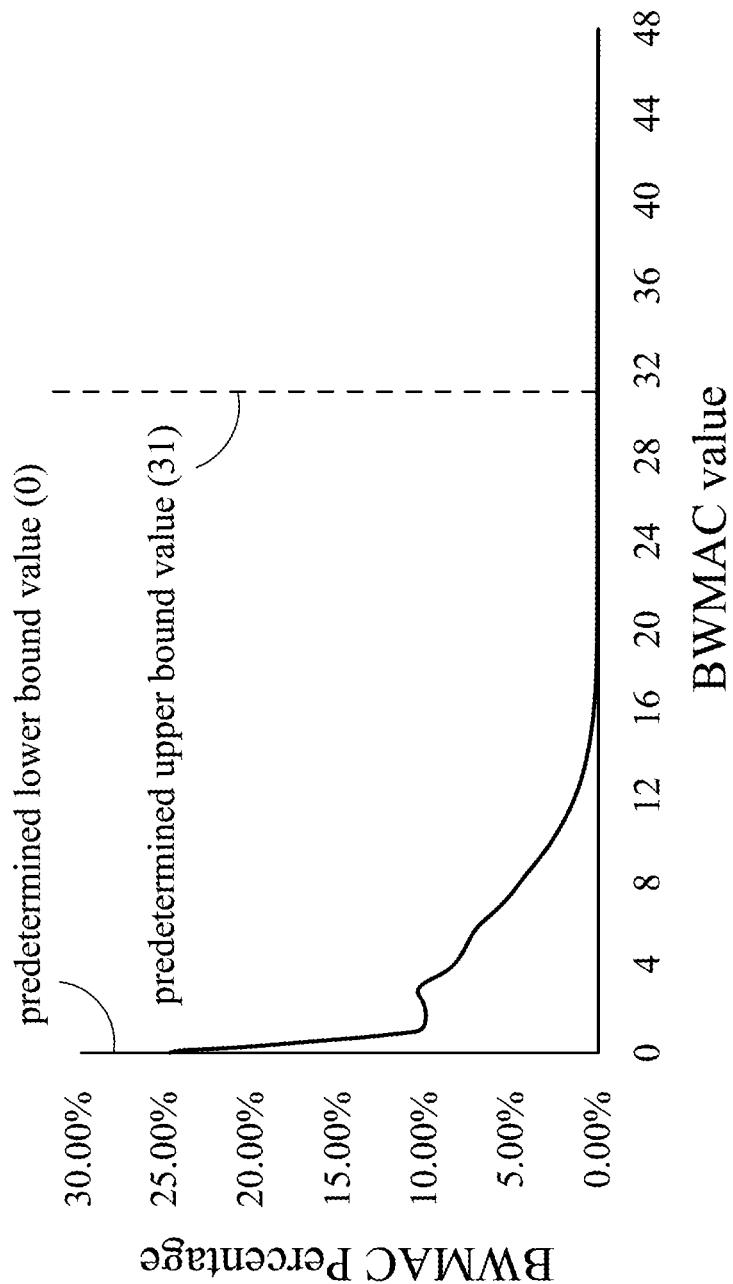
FIG. 7 shows a schematic view of a distribution of a plurality of bit wise multiply-accumulate values of the bit wise multiply-accumulate step of FIG. 1.

Please refer to FIGS. 1-7. FIG. 1 shows a flow chart of a dynamic gradient calibration method 100 for a computing-in-memory (CIM) neural network according to a first embodiment of the present disclosure. FIG. 2 shows a block diagram of a system of the dynamic gradient calibration method 100 for the CIM neural network of FIG. 1. FIG. 3 shows a schematic view of a multiply-accumulate (MAC) operation mapping to a CIM circuit 210. FIG. 4 shows a schematic view of a probability distribution of a word wise MAC operation with 4-bit inputs, 2-bit weights and 2-channel accumulations. FIG. 5 shows a schematic view of a probability distribution of a bit wise MAC operation with 4-bit inputs, 2-bit weights and 2-channel accumulations. FIG. 6A shows a schematic view of a word wise forward propagation and a word wise backward propagation (WFWB). FIG. 6B shows a schematic view of a bit wise forward propagation and the word wise backward propagation (BFWB) of the dynamic gradient calibration method 100 of FIG. 1. FIG. 7 shows a schematic view of a distribution of a plurality of bit wise multiply-accumulate values $BWMAC_{ij}$ of the bit wise multiply-accumulate step S022 of FIG. 1. The dynamic gradient calibration method 100 for the CIM neural network is performed to update a plurality of weights (e.g., $W_k$ in FIG. 3) in the CIM circuit 210 according to a plurality of inputs (e.g., $IN_k$ in FIG. 3) corresponding to a correct answer. The dynamic gradient calibration method 100 includes a forward operating step S02 and a backward operating step S04.

The forward operating step S02 includes a bit wise multiply-accumulate step S022, a clamping step S024 and a comparing step S026. The bit wise multiply-accumulate step S022 includes dividing each of the inputs (e.g., $IN_k[m-1:0]$ and $IN_{k+1}[m-1:0]$ in FIG. 6B) into a plurality of divided inputs (e.g., $IN_k[1:0]$-$IN_k[m-1:m-2]$ and $IN_{k+1}[1:0]$-$IN_{k+1}[m-1:m-2]$ in FIG. 6B), dividing each of the weights (e.g., $W_k[n-1:0]$ and $W_{k+1}[n-1:0]$ in FIG. 6B) into a plurality of divided weights (e.g., $W_k[0]$-$W_k[n-1]$ and $W_{k+1}[0]$-$W_{k+1}[n-1]$ in FIG. 6B), and performing a bit wise multiply-accumulate operation on the divided inputs $IN_k[1:0]$-$IN_k[m-1:m-2]$, $IN_{k+1}[1:0]$-$IN_{k+1}[m-1:m-2]$ and the divided weights $W_k[0]$-$W_k[n-1]$, $W_{k+1}[0]$-$W_{k+1}[n-1]$ to generate a plurality of multiply-accumulate values MACV. In detail, the bit wise multiply-accumulate operation includes calculating the divided inputs $IN_k[1:0]$-$IN_k[m-1:m-2]$, $IN_{k+1}[1:0]$-$IN_{k+1}[m-1:m-2]$ and the divided weights $W_k[0]$-$W_k[n-1]$, $W_{k+1}[0]$-$W_{k+1}[n-1]$ according to a convolution calculation to generate the bit wise multiply-accumulate values $BWMAC_{ij}$ (e.g., $BWMAC_{00}$, $BWMAC_{10}$, $BWMAC_{01}$ and $BWMAC_{11}$ in FIG. 5), and then performing an analog-to-digital conversion on the bit wise multiply-accumulate values $BWMAC_{ij}$ to generate a plurality of digital bit wise multiply-accumulate values $BWMAC_{ij}D$ (e.g., $BWMAC_{00}D$, $BWMAC_{10}D$, $BWMAC_{01}D$ and $BWMAC_{11}D$ in FIG. 5). The bit wise multiply-accumulate operation further includes weighting and combining the digital bit wise multiply-accumulate values $BWMAC_{ij}D$ to generate the multiply-accumulate values MACV. One of the multiply-accumulate values MACV is calculated by a sign function, a plurality of variable factors, the divided inputs and the divided weights. The sign function is represented as sign. The variable factors are represented as i, j, k, respectively. The divided inputs are represented as $IN_k$. The divided weights are represented as $W_k$. The one of the multiply-accumulate values MACV is described as follows:

$$MACV = \Sigma_{i=0}^{1} \Sigma_{j=0}^{7} \text{sign} * 2^{j} * 4^{i} * (\Sigma_{k=0}^{15} IN_k[i*2+1:i*2] * W_k[j]) \quad (1).$$

In addition, the bit wise multiply-accumulate step S022 further includes performing a splitting step. The splitting step includes performing a split function on the weights $W_k[n-1:0]$, $W_{k+1}[n-1:0]$ and the inputs $IN_k[m-1:0]$, $IN_{k+1}[m-1:0]$ so as to divide each of the inputs $IN_k[m-1:0]$, $IN_{k+1}[m-1:0]$ into the divided inputs $IN_k[1:0]$-$IN_k[m-1:m-2]$, $IN_{k+1}[1:0]$-$IN_{k+1}[m-1:m-2]$ and divide each of the weights $W_k[n-1:0]$, $W_{k+1}[n-1:0]$ into the divided weights $W_k[0]$-$W_k[n-1]$, $W_{k+1}[0]$-$W_{k+1}[n-1]$.

The clamping step S024 includes obtaining a predetermined upper bound value (e.g., 31) and a predetermined lower bound value (e.g., 0), and performing a clamping function on the multiply-accumulate values MACV to generate a plurality of clamped multiply-accumulate values Z' according to the predetermined upper bound value and the predetermined lower bound value. Each of the clamped multiply-accumulate values Z' is between the predetermined upper bound value and the predetermined lower bound value. In detail, the clamping function includes setting the clamped multiply-accumulate values Z' to the multiply-accumulate values MACV, respectively. In response to determining that one of the clamped multiply-accumulate values Z' is greater than the predetermined upper bound value, setting the one of the clamped multiply-accumulate values Z' to the predetermined upper bound value. The multiply-accumulate values have a maximum value (e.g., 48) and a minimum value (e.g., 0). The predetermined upper bound value is greater than the minimum value and smaller than the maximum value. The predetermined lower bound value is equal to the minimum value. In other words, each of the clamped multiply-accumulate values Z' is smaller than or equal to the predetermined upper bound value and greater than or equal to the predetermined lower bound value. When 16-channel accumulations are performed to generate the bit wise multiply-accumulate values $BWMAC_{ij}$ with 4-bit inputs and 8-bit weights, the range of the bit wise multiply-accumulate values $BWMAC_{ij}$ is between 0 and 48, and most of the bit wise multiply-accumulate values $BWMAC_{ij}$ are small, as shown in FIG. 7. The smaller the weight, the smaller the impact on the bit wise multiply-accumulate values $BWMAC_{ij}$, so that it is not required to sense full precision on the output bit line and the output bit line bar with small weight.

The comparing step S026 includes comparing the clamped multiply-accumulate values Z' with the correct answer to generate a plurality of loss values L.

The backward operating step S04 includes a partial differential operating step S042. The partial differential operating step S042 includes performing a partial differential operation on the loss values L relative to the weights (W1=$W_k[n-1:0]$, and W2=$W_{k+j}[n-1:0]$) to generate a plurality of weight-based gradients $$\frac{\partial L}{\partial W1}, \frac{\partial L}{\partial W2}.$$

The weights ($W_k[n-1:0]$ and $W_{k+1}[n-1:0]$) are updated according to the weight-based gradients $$\frac{\partial L}{\partial W1}, \frac{\partial L}{\partial W2}.$$

The partial differential operating step S042 further includes performing the partial differential operation on the loss values L relative to the clamped multiply-accumulate values Z' to generate an output-based gradient $$\frac{\partial L}{\partial Z}$$

(i.e., E1), and performing the partial differential operation on the loss values L relative to the inputs $IN_k[m-1:0]$, $IN_{k+1}[m-1:0]$ to generate a plurality of input-based gradients $$\frac{\partial L}{\partial X1}, \frac{\partial L}{\partial X2}$$

(i.e., E2, E3), as shown in FIG. 6B.

Table 1 lists accuracy values of WFWB and BFWB of the dynamic gradient calibration method 100 for the CIM neural network of the present disclosure. The accuracy values include a best accuracy value, an average accuracy value and a worst accuracy value. The best accuracy value is represented as "Best acc". The average accuracy value is represented as "Average acc". The worst accuracy value, is represented as "Worst acc". "Clamp31" represents that the predetermined upper bound value is set to 31. The best accuracy value of WFWB is equal to 91.9, and the best accuracy value of BFWB of the dynamic gradient calibration method 100 for the CIM neural network of the present disclosure is equal to 92.39. Therefore, the dynamic gradient calibration method 100 for the CIM neural network of the present disclosure can utilize BFWB and the clamping step S024 to drastically reduce power consumption without affecting the accuracy of the CIM neural network, so that it is suitable for the CIM neural network.

TABLE 1

| Data set | Model | In/W bits | Case | Best acc | Average acc | Worst acc |
|---|---|---|---|---|---|---|
| Cifar10 | Resnet20 | 4/8 | Benchmark | 92.48 | 92.25 | 92.06 |
| Cifar10 | Resnet20 | 4/8 | WFWB Clamp31 | 91.9 | 91.67 | 91.5 |
| Cifar10 | Resnet20 | 4/8 | BFWB Clamp31 | 92.39 | 92.2 | 92.05 |

Figure 8:
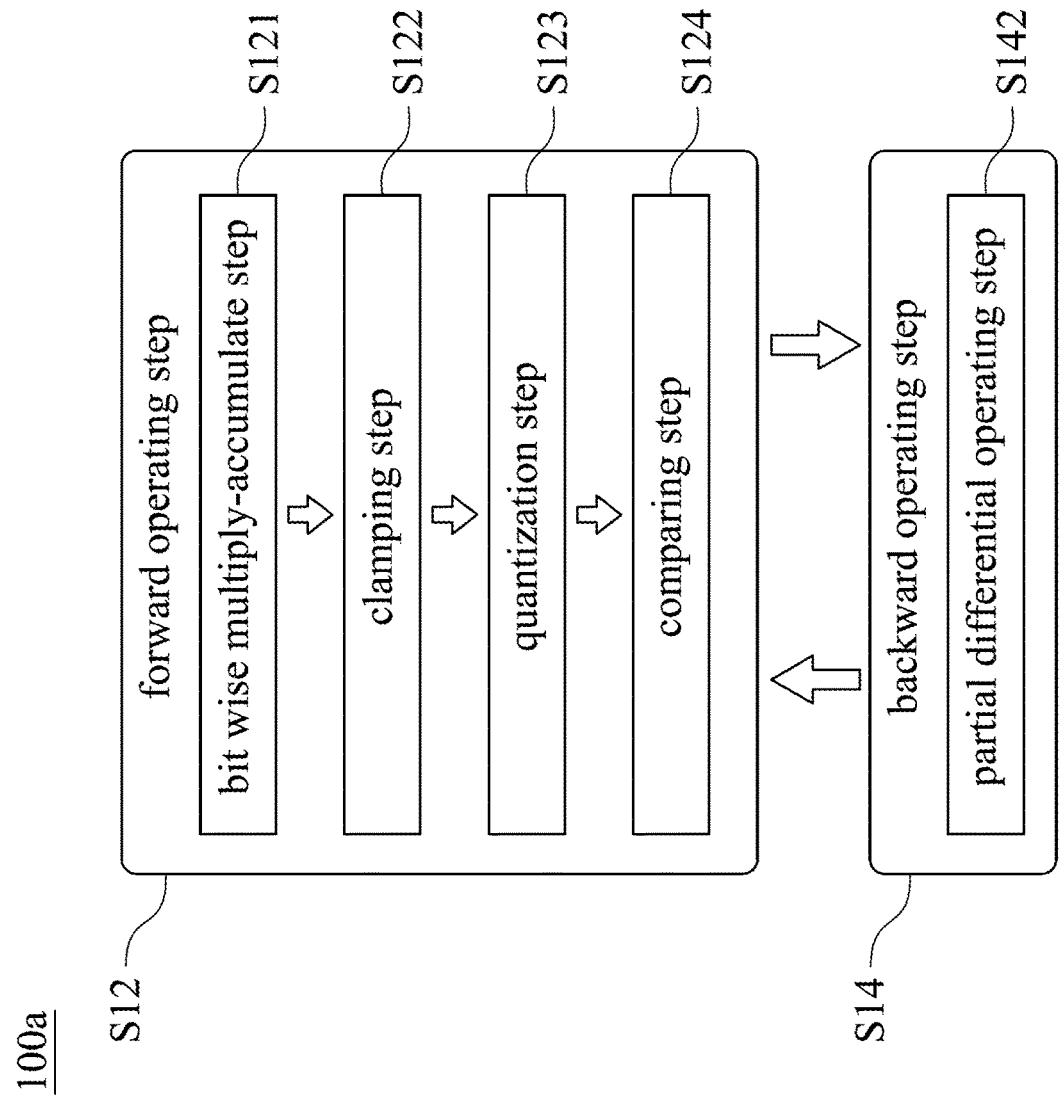
FIG. 8 shows a flow chart of a dynamic gradient calibration method for a CIM neural network according to a second embodiment of the present disclosure.
Figure 9A:
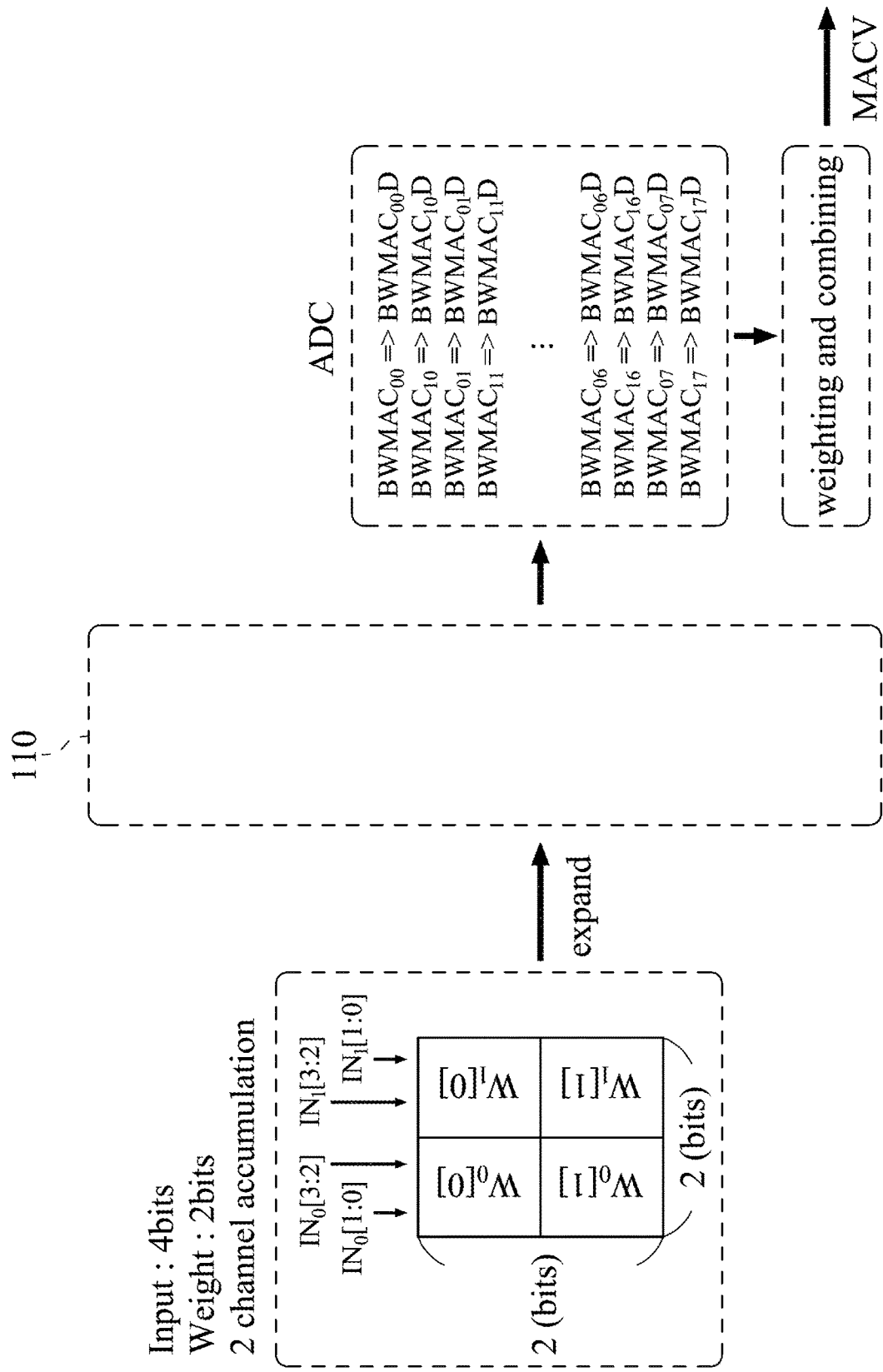
FIG. 9A shows a schematic view of a bit wise MAC operation with 4-bit inputs, 8-bit weights and 16-channel accumulations.
Figure 9B:
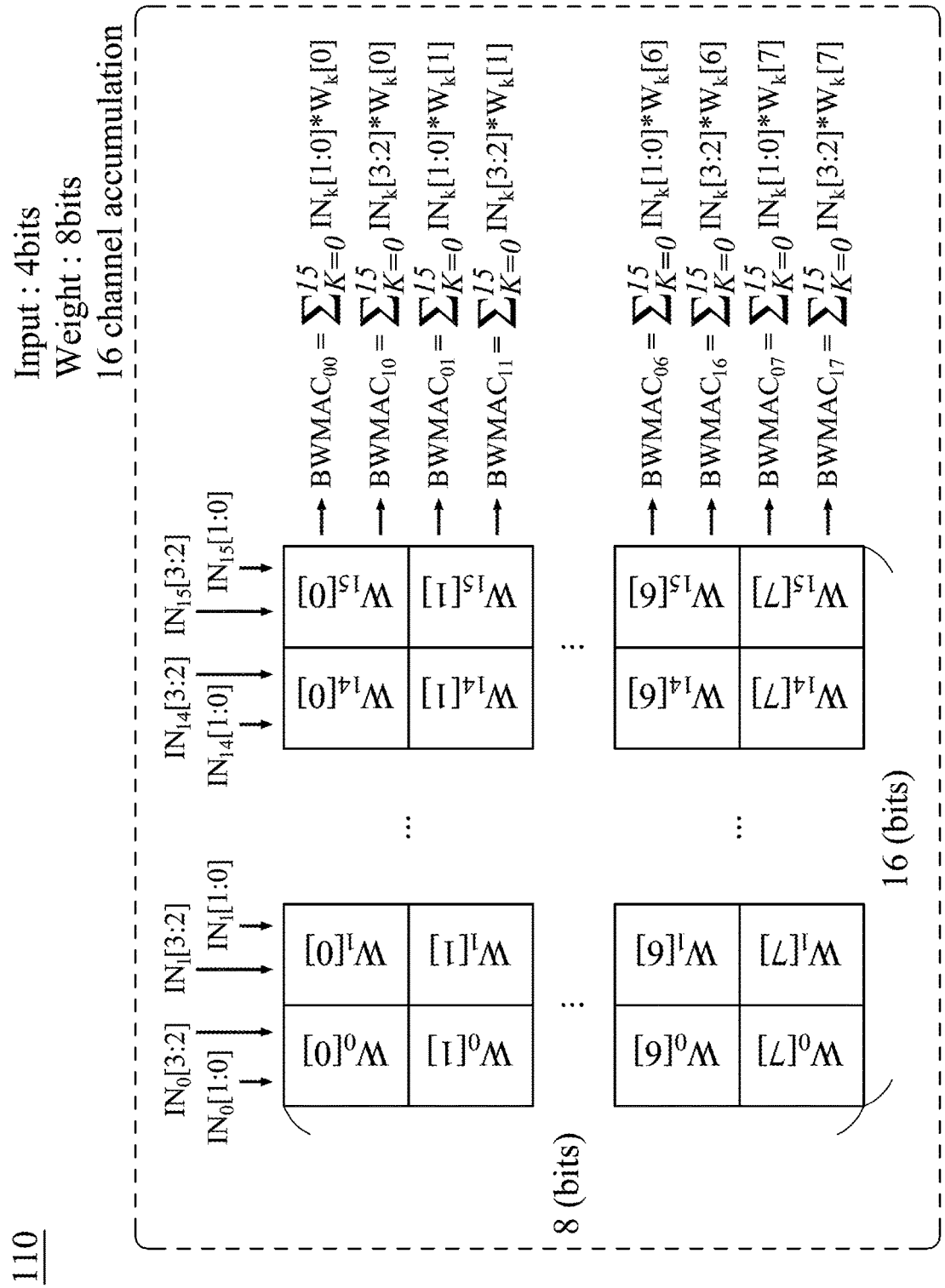
FIG. 9B shows a schematic view of a convolution calculation of the bit wise MAC operation of FIG. 9A.
Figure 10:
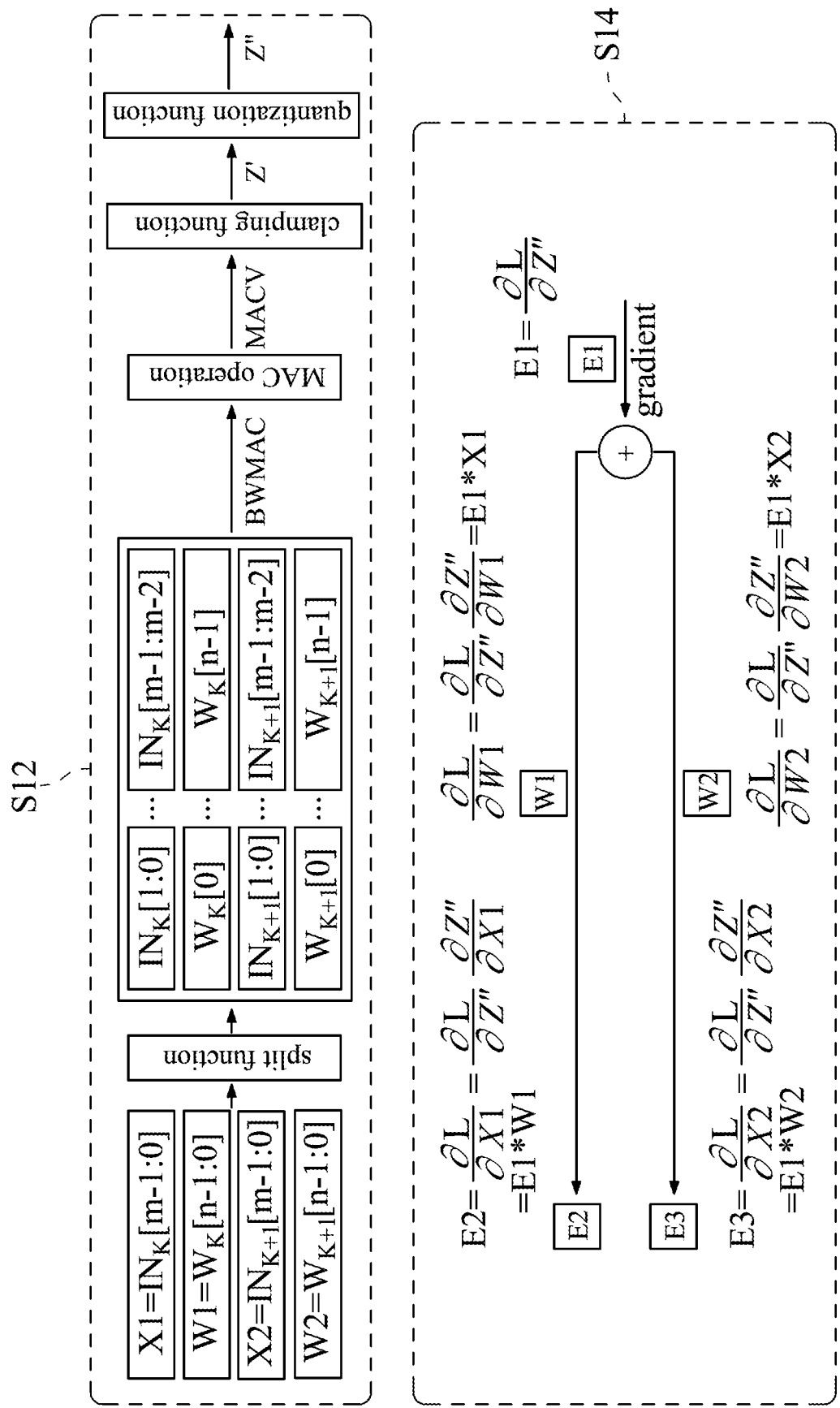
FIG. 10 shows a schematic view of a bit wise forward propagation and a word wise backward propagation of the dynamic gradient calibration method of FIG. 8.
Figure 11:
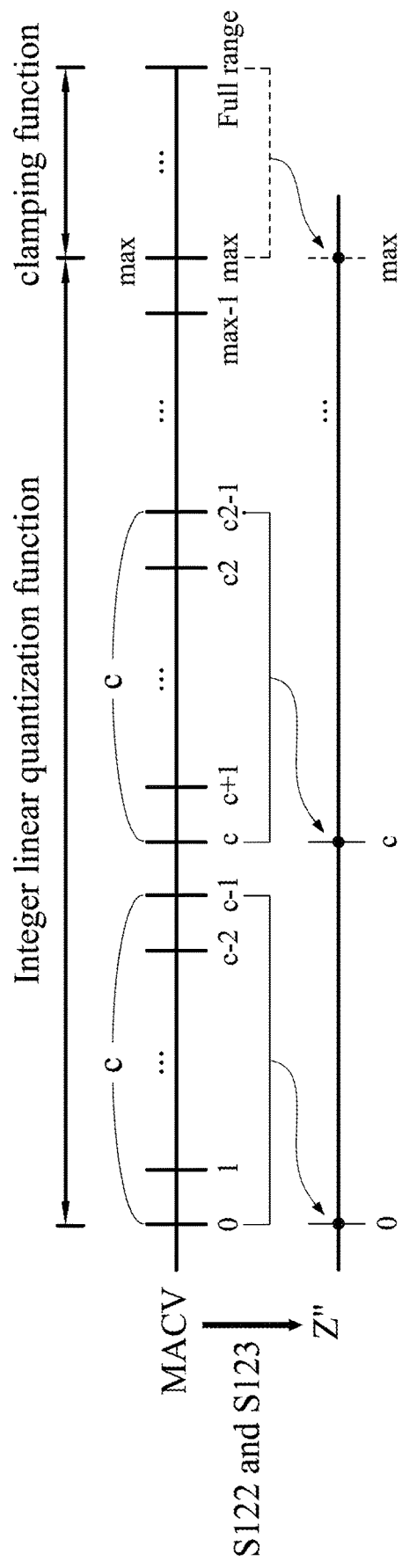
FIG. 11 shows a schematic view of a clamping step and a quantization step of the dynamic gradient calibration method of FIG. 8.

Please refer to FIGS. 2 and 8-11. FIG. 8 shows a flow chart of a dynamic gradient calibration method 100a for a CIM neural network according to a second embodiment of the present disclosure. FIG. 9A shows a schematic view of a bit wise MAC operation with 4-bit inputs, 8-bit weights and 16-channel accumulations. FIG. 9B shows a schematic view of a convolution calculation 110 of the bit wise MAC operation of FIG. 9A. FIG. 10 shows a schematic view of a bit wise forward propagation and a word wise backward propagation (BFWB) of the dynamic gradient calibration method 100a of FIG. 8. FIG. 11 shows a schematic view of a clamping step S122 and a quantization step S123 of the dynamic gradient calibration method 100a of FIG. 8. The dynamic gradient calibration method 100a for the CIM neural network is performed to update a plurality of weights (e.g., $W_k$ in FIG. 9B) in a CIM circuit 210 according to a plurality of inputs (e.g., $IN_k$ in FIG. 9B). The inputs are corresponding to a correct answer. The dynamic gradient calibration method 100a includes a forward operating step S12 and a backward operating step S14.

The forward operating step S12 includes a bit wise multiply-accumulate step S121, a clamping step S122, a quantization step S123 and a comparing step S124. In FIG. 8, the details of the bit wise multiply-accumulate step S121 and the clamping step S122 are the same as the bit wise multiply-accumulate step S022 and the clamping step S024 of FIG. 1. The forward operating step S12 further includes the quantization step S123 and the comparing step S124. The quantization step S123 includes performing a quantization function on the clamped multiply-accumulate values Z' to generate a plurality of quantized multiply-accumulate values Z". The comparing step S124 includes comparing the quantized multiply-accumulate values Z" with the correct answer to generate a plurality of loss values L. In detail, the quantization step S123 applied in the CNN may be regarded as "hierarchical bit wise quantization neural network (HBWQNN)". The quantization function of the quantization step S123 is an integer linear quantization function, as shown in FIG. 10. The integer linear quantization function is calculated by a Gauss function and a merged value. The merged value represents a number of a plurality of values merged into a local minimum value. The integer linear quantization function is represented as $\text{quantize}_{IL}$. The Gauss function is represented as G, and the merged value is represented as c. The quantized multiply-accumulate values Z" are described as follows:

$$Z'' = \text{quantize}_{IL}(Z', c) = c \times G(Z'/c) \qquad (2).$$

Figure 12:
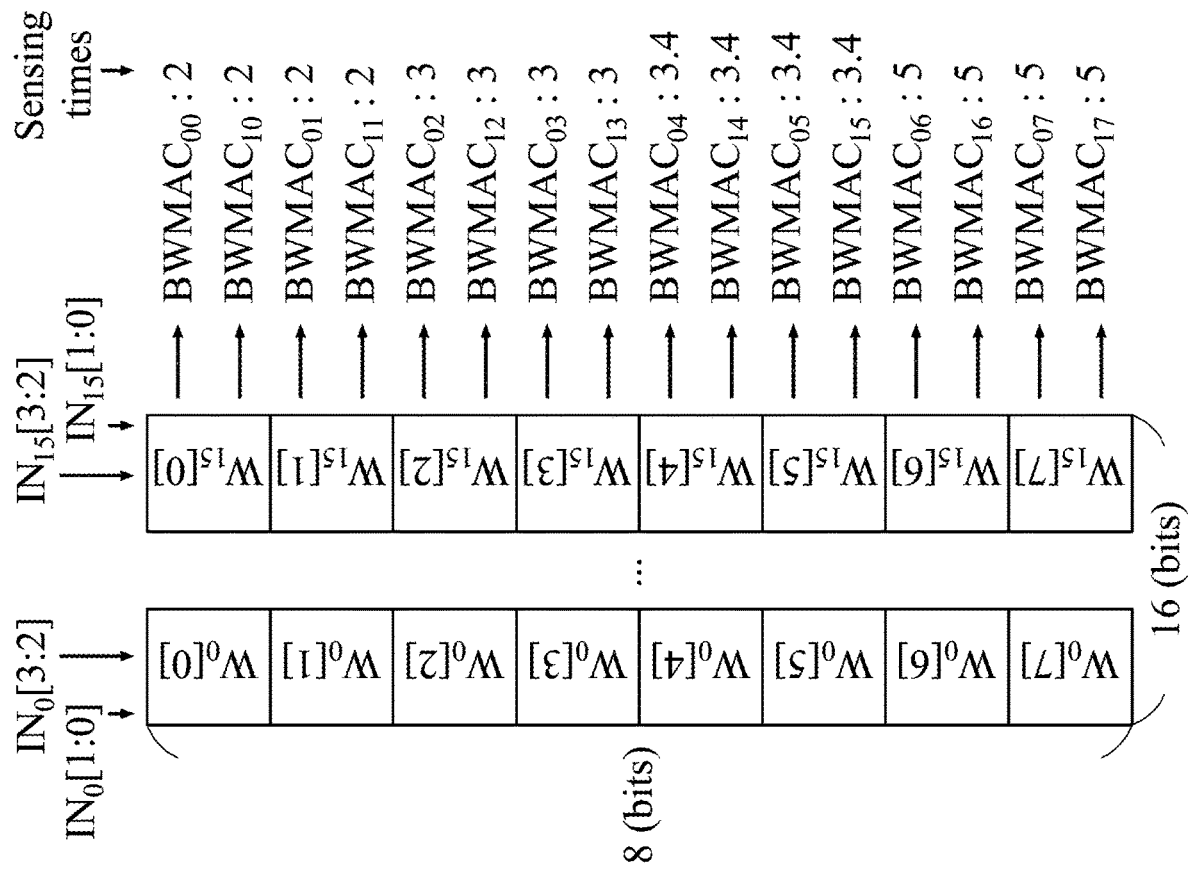
FIG. 12 shows a schematic view of one example of sensing times of the bit wise multiply-accumulate values of FIG. 9B.

Please refer to FIG. 12 and Table 2. FIG. 12 shows a schematic view of one example of sensing times of the bit wise multiply-accumulate values $BWMAC_{ij}$ of FIG. 9B. Table 2 lists one example of a plurality of parameter settings of generating the bit wise multiply-accumulate values $BWMAC_{ij}$ of FIG. 9B and is regarded as Case I. "nacc" represents a channel number of accumulations. "Wc" represents a bit number of each of the weights (e.g., $W_k[1:0]$). "Ic" represents a bit number of each of the inputs $IN_k[3:0]$. "max" represents the predetermined upper bound value. "c" represents the merged value. "$w_{ij}$" represents a bit wise weight of each of the bit wise multiply-accumulate values $BWMAC_{ij}$. "times" represents a sensing time of one of the bit wise multiply-accumulate values $BWMAC_{ij}$. In Case I, "nacc", "Wc" and "Ic" are equal to 16, 8 and 4, respectively, and the sensing times corresponding to the bit wise weights $w_{04}$, $w_{13}$ do not follow a rule of the present disclosure (i.e., the greater "$w_{ij}$" is, the greater "times" is). In other words, Case I does not strictly abide by the rule. Case I is corresponding to the dynamic gradient calibration method 100a of FIGS. 8 and 10 without the rule.

TABLE 2

| Case I | | |
|---|---|---|
| nacc: 16 Wc: 8 Ic: 4 | $IN_k[1:0]$ | $IN_k[3:2]$ |
| $W_k[0]$ | $BWMAC_{00}$, $w_{00}$: $4^0 * 2^0 = 1$ max: 7, c: 2, times: 2 | $BWMAC_{10}$, $w_{10}$: $4^1 * 2^0 = 4$ max: 7, c: 2, times: 2 |
| $W_k[1]$ | $BWMAC_{01}$, $w_{01}$: $4^0 * 2^1 = 2$ max: 7, c: 2, times: 2 | $BWMAC_{11}$, $w_{11}$: $4^1 * 2^1 = 8$ max: 7, c: 2, times: 2 |
| $W_k[2]$ | $BWMAC_{02}$, $w_{02}$: $4^0 * 2^2 = 4$ max: 15, c: 2, times: 3 | $BWMAC_{12}$, $w_{12}$: $4^1 * 2^2 = 16$ max: 15, c: 2, times: 3 |
| $W_k[3]$ | $BWMAC_{03}$, $w_{03}$: $4^0 * 2^3 = 8$ max: 15, c: 2, times: 3 | $BWMAC_{13}$, $w_{13}$: $4^1 * 2^3 = 32$ max: 15, c: 2, times: 3 |
| $W_k[4]$ | $BWMAC_{04}$, $w_{04}$: $4^0 * 2^4 = 16$ max: 31, c: 2, times: 3.4 | $BWMAC_{14}$, $w_{14}$: $4^1 * 2^4 = 64$ max: 31, c: 2, times: 3.4 |
| $W_k[5]$ | $BWMAC_{05}$, $w_{05}$: $4^0 * 2^5 = 32$ max: 31, c: 2, times: 3.4 | $BWMAC_{15}$, $w_{15}$: $4^1 * 2^5 = 128$ max: 31, c: 2, times: 3.4 |
| $W_k[6]$ | $BWMAC_{06}$, $w_{06}$: $4^0 * 2^6 = 64$ max: 31, c: 1, times: 5 | $BWMAC_{16}$, $w_{16}$: $4^1 * 2^6 = 256$ max: 31, c: 1, times: 5 |

TABLE 2-continued

| Case I | | |
|---|---|---|
| nacc: 16 | | |
| Wc: 8 | | |
| Ic: 4 | $IN_k[1:0]$ | $IN_k[3:2]$ |
| $W_k[7]$ | $BWMAC_{07}$, $w_{07}$: $-4^0*2^7 = -128$ max: 31, c: 1, times: 5 | $BWMAC_{17}$, $w_{17}$: $-4^1*2^7 = -512$ max: 31, c: 1, times: 5 |

Figure 13:
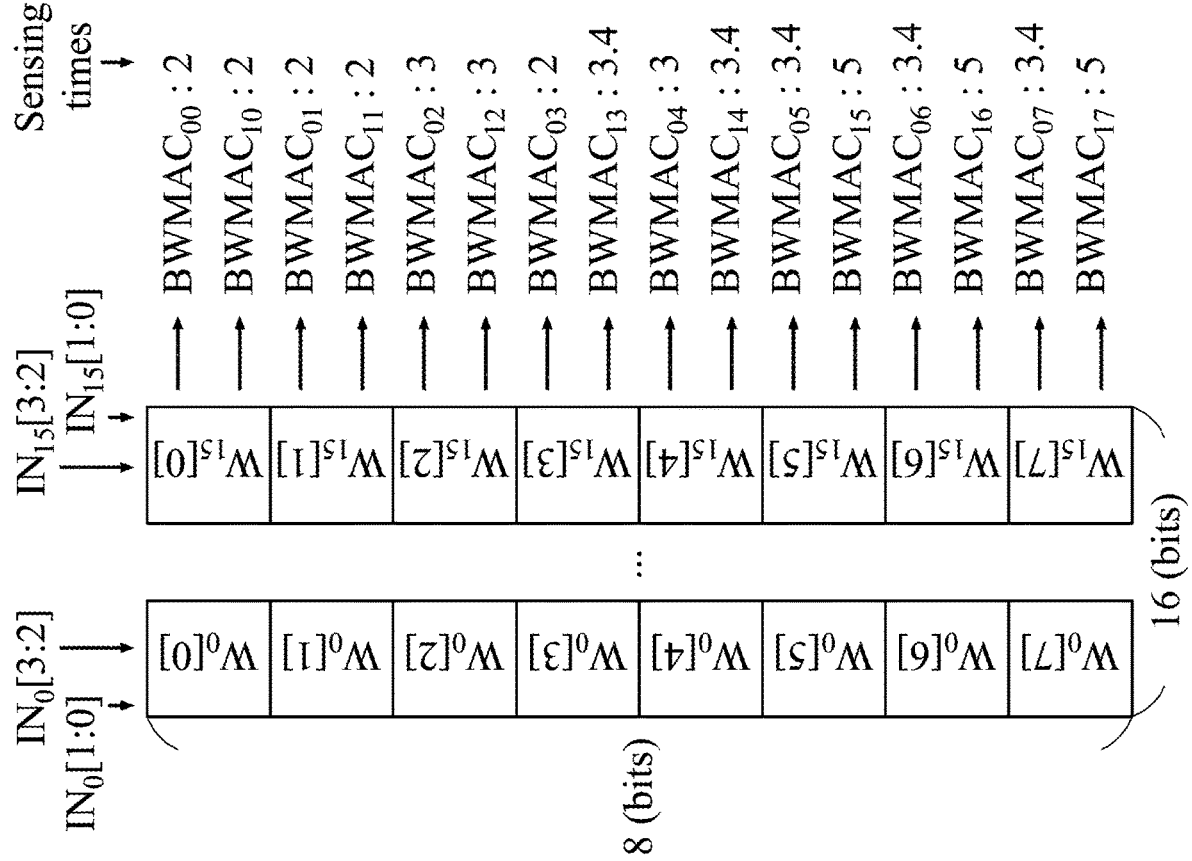
FIG. 13 shows a schematic view of another example of sensing times of the bit wise multiply-accumulate values of FIG. 9B.

Please refer to FIG. 13 and Table 3. FIG. 13 shows a schematic view of another example of sensing times of the bit wise multiply-accumulate values $BWMAC_{ij}$ of FIG. 9B. Table 3 lists another example of the parameter settings of generating the bit wise multiply-accumulate values $BWMAC_{ij}$ of FIG. 9B and is regarded as Case II. In Case II, "nacc", "Wc" and "Ic" are equal to 16, 8 and 4, respectively, and the sensing times corresponding to the bit wise weights $w_{04}$, $w_{13}$ follow the rule of the present disclosure (i.e., the greater "$w_{ij}$" is, the greater "times" is). Case II is corresponding to the dynamic gradient calibration method 100a of FIGS. 8 and 10 with the rule.

TABLE 3

| Case II | | |
|---|---|---|
| nacc: 16 | | |
| Wc: 8 | | |
| Ic: 4 | $IN_k[1:0]$ | $IN_k[3:2]$ |
| $W_k[0]$ | $BWMAC_{00}$, $w_{00}$: $4^0*2^0 = 1$ max: 7, c: 2, times: 2 | $BWMAC_{10}$, $w_{10}$: $4^1*2^0 = 4$ max: 7, c: 2, times: 2 |
| $W_k[1]$ | $BWMAC_{01}$, $w_{01}$: $4^0*2^1 = 2$ max: 7, c: 2, times: 2 | $BWMAC_{11}$, $w_{11}$: $4^1*2^1 = 8$ max: 7, c: 2, times: 2 |
| $W_k[2]$ | $BWMAC_{02}$, $w_{02}$: $4^0*2^2 = 4$ max: 15, c: 2, times: 2 | $BWMAC_{12}$, $w_{12}$: $4^1*2^2 = 16$ max: 15, c: 2, times: 3 |
| $W_k[3]$ | $BWMAC_{03}$, $w_{03}$: $4^0*2^3 = 8$ max: 15, c: 2, times: 2 | $BWMAC_{13}$, $w_{13}$: $4^1*2^3 = 32$ max: 15, c: 2, times: 3.4 |
| $W_k[4]$ | $BWMAC_{04}$, $w_{04}$: $4^0*2^4 = 16$ max: 31, c: 2, times: 3 | $BWMAC_{14}$, $w_{14}$: $4^1*2^4 = 64$ max: 31, c: 2, times: 3.4 |
| $W_k[5]$ | $BWMAC_{05}$, $w_{05}$: $4^0*2^5 = 32$ max: 31, c: 2, times: 3.4 | $BWMAC_{15}$, $w_{15}$: $4^1*2^5 = 128$ max: 31, c: 2, times: 5 |
| $W_k[6]$ | $BWMAC_{06}$, $w_{06}$: $4^0*2^6 = 64$ max: 31, c: 1, times: 3.4 | $BWMAC_{16}$, $w_{16}$: $4^1*2^6 = 256$ max: 31, c: 1, times: 5 |
| $W_k[7]$ | $BWMAC_{07}$, $w_{07}$: $-4^0*2^7 = -128$ max: 31, c: 1, times: 5 | $BWMAC_{17}$, $w_{17}$: $-4^1*2^7 = -512$ max: 31, c: 1, times: 5 |

TABLE 4

| Data set | Model | In/W bits | Case | Best acc | Average acc | Worst acc | Read out bits |
|---|---|---|---|---|---|---|---|
| Cifar10 | Resnet20 | 4/8 | Benchmark | 92.48 | 92.25 | 92.06 | 96 |
| Cifar10 | Resnet20 | 4/8 | Case I | 92.13 | 91.85 | 91.48 | 53.6 |
| Cifar10 | Resnet20 | 4/8 | Case II | 92.35 | 92.135 | 91.94 | 51.6 |

Figure 14:
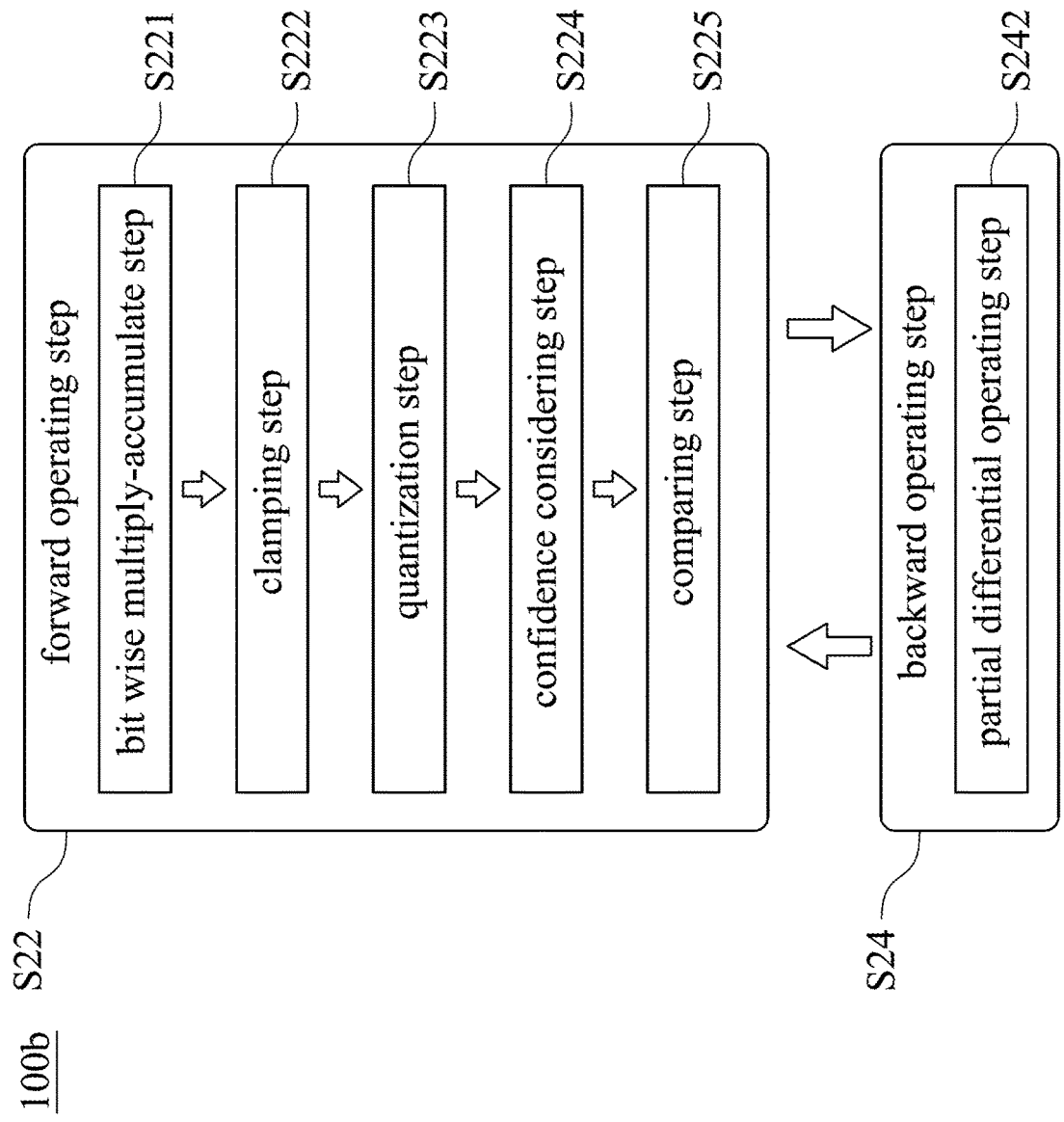
FIG. 14 shows a flow chart of a dynamic gradient calibration method for a CIM neural network according to a third embodiment of the present disclosure.
Figure 15:
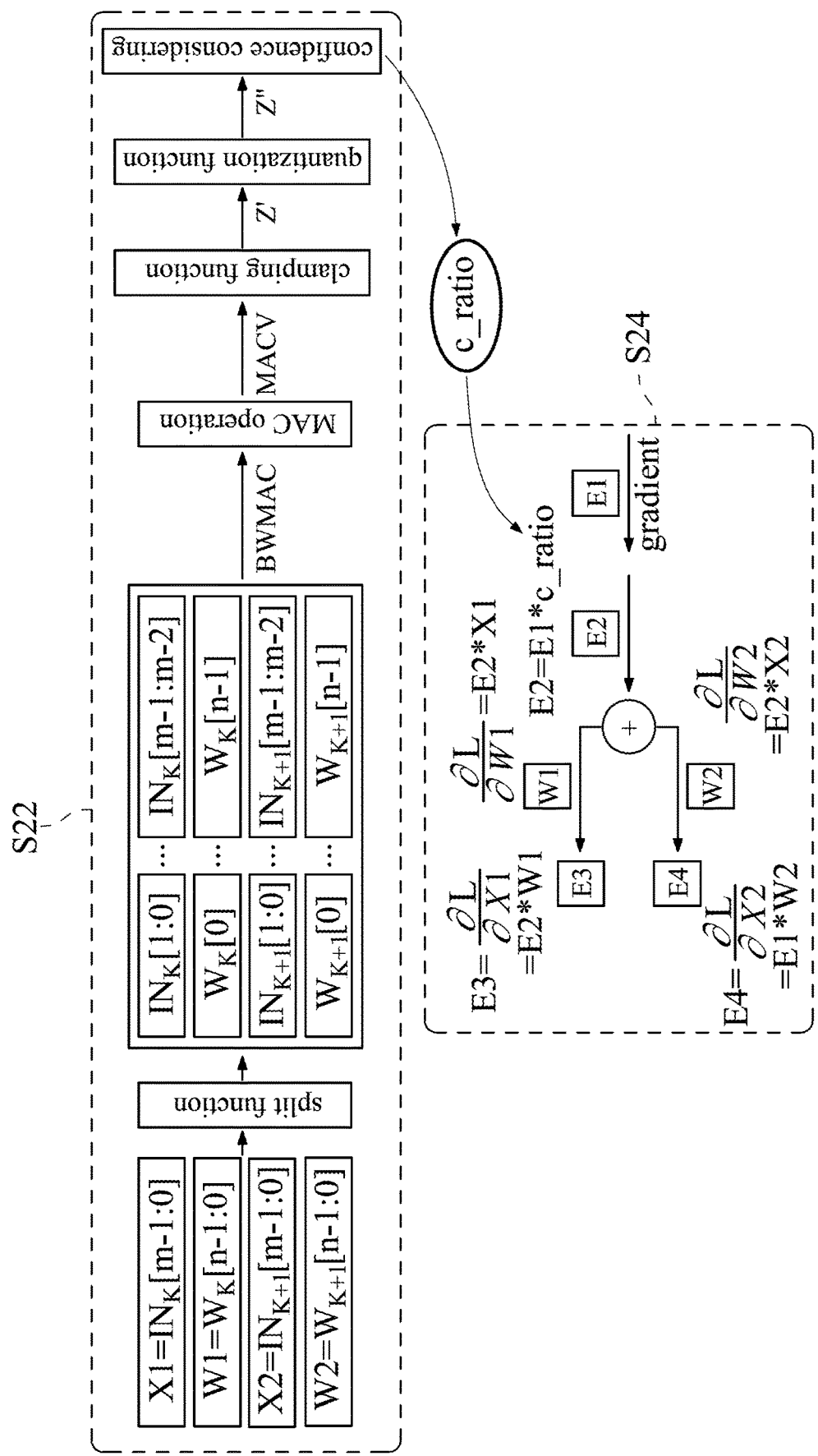
FIG. 15 shows a schematic view of a bit wise forward propagation and a word wise backward propagation of the dynamic gradient calibration method of FIG. 14.

Please refer to FIGS. 2, 9A, 9B, 14 and 15. FIG. 14 shows a flow chart of a dynamic gradient calibration method 100b Table 4 lists accuracy values of Case I and Case II of the dynamic gradient calibration method 100a for the CIM neural network of the present disclosure. Case II senses less bits than Case I and has a higher accuracy than Case I. Because one of the bit wise multiply-accumulate values $BWMAC_{ij}$ with a small bit wise weight $w_{ij}$ has a small contribution to the outputs (i.e., the multiply-accumulate values MACV), the one of the bit wise multiply-accumulate values $BWMAC_{ij}$ does not require full-precision readout. In one embodiment, the predetermined upper bound value (max) may be equal to $2^p-1$, and the merged value (c) may be equal to $2^q$. The sensing time may be equal to p-q, but the present disclosure is not limited thereto. Accordingly, the dynamic gradient calibration method 100a for the CIM neural network of the present disclosure utilizes HBWQNN with adaptive sensing times of the bit wise multiply-accumulate values $BWMAC_{ij}$ in the quantization function to change the readout precision so as to drastically reduce power consumption without affecting the accuracy of the CIM neural network.

for a CIM neural network according to a third embodiment of the present disclosure. FIG. 15 shows a schematic view of a bit wise forward propagation and a word wise backward propagation (BFWB) of the dynamic gradient calibration method 100b of FIG. 14. The dynamic gradient calibration method 100b for the CIM neural network is performed to update a plurality of weights (e.g., $W_k$ in FIG. 9B) in a CIM circuit 210 according to a plurality of inputs (e.g., $IN_k$ in FIG. 9B). The inputs are corresponding to a correct answer. The dynamic gradient calibration method 100b includes a forward operating step S22 and a backward operating step S24.

The forward operating step S22 includes a bit wise multiply-accumulate step S221, a clamping step S222, a quantization step S223, a confidence considering step S224 and a comparing step S225. In FIG. 14, the details of the bit wise multiply-accumulate step S221, the clamping step S222 and the quantization step S223 are the same as the bit wise multiply-accumulate step S121, the clamping step S122 and the quantization step S123 of FIG. 8. The forward operating step S22 further includes the confidence considering step S224 and the comparing step S225. The confidence considering step S224 includes calculating a weight bit number, an input bit number and a confidence factor to generate a confidence rate. The confidence factor is configured to decide whether or not one of the quantized multiply-accumulate values Z" is correspondingly equal to one of the multiply-accumulate values MACV. The weight bit number is represented as Wc, the input bit number is represented as Ic, the confidence factor is represented as ori, and the confidence rate is represented as c_ratio and described as follows:

$$c\_ratio = (\Sigma_{i=0}^{Ic/2-1} \Sigma_{j=0}^{Wc-1} 2^j * 4^i) / (\Sigma_{i=0}^{Ic/2-1} \Sigma_{j=0}^{Wc-1} 2^j * 4^i * ori) \quad (3).$$

In response to determining that the one of the quantized multiply-accumulate values Z" is correspondingly equal to the one of the multiply-accumulate values MACV, the confidence factor ori is equal to 1. In response to determining that the one of the quantized multiply-accumulate values Z" is correspondingly different from the one of the multiply-accumulate values MACV, the confidence factor on is equal to 0.

Tables 5 and 6 list further another example of the parameter settings of generating the bit wise multiply-accumulate values $BWMAC_{ij}$ and are regarded as Case III. In Case III, "nacc", "Wc" and "Ic" are equal to 16, 8 and 8, respectively, and the sensing times corresponding to the bit wise weights follow the rule of the present disclosure (i.e., the greater "$w_{ij}$" is, the greater "times" is). Case III is corresponding to the dynamic gradient calibration method 100b of FIGS. 14 and 15 with the rule.

TABLE 5

| | Case III (first part) | |
|---|---|---|
| nacc: 16 | | |
| Wc: 8 | | |
| Ic: 8 | $IN_k[1:0]$ | $IN_k[3:2]$ |
| $W_k[0]$ | $BWMAC_{00}$, $w_{00}$: $4^0*2^0 = 1$<br>max: 7, c: 2, times: 2 | $BWMAC_{10}$, $w_{10}$: $4^1*2^0 = 4$<br>max: 7, c: 2, times: 2 |
| $W_k[1]$ | $BWMAC_{01}$, $w_{01}$: $4^0*2^1 = 2$<br>max: 7, c: 2, times: 2 | $BWMAC_{11}$, $w_{11}$: $4^1*2^1 = 8$<br>max: 7, c: 2, times: 2 |
| $W_k[2]$ | $BWMAC_{02}$, $w_{02}$: $4^0*2^2 = 4$<br>max: 15, c: 2, times: 2 | $BWMAC_{12}$, $w_{12}$: $4^1*2^2 = 16$<br>max: 15, c: 2, times: 3 |
| $W_k[3]$ | $BWMAC_{03}$, $w_{03}$: $4^0*2^3 = 8$<br>max: 15, c: 2, times: 2 | $BWMAC_{13}$, $w_{13}$: $4^1*2^3 = 32$<br>max: 15, c: 2, times: 3 |
| $W_k[4]$ | $BWMAC_{04}$, $w_{04}$: $4^0*2^4 = 16$<br>max: 31, c: 2, times: 3 | $BWMAC_{14}$, $w_{14}$: $4^1*2^4 = 64$<br>max: 31, c: 2, times: 3.47 |
| $W_k[5]$ | $BWMAC_{05}$, $w_{05}$: $4^0*2^5 = 32$<br>max: 31, c: 2, times: 3 | $BWMAC_{15}$, $w_{15}$: $4^1*2^5 = 128$<br>max: 31, c: 2, times: 3.47 |
| $W_k[6]$ | $BWMAC_{06}$, $w_{06}$: $4^0*2^6 = 64$<br>max: 31, c: 1, times: 3.47 | $BWMAC_{16}$, $w_{16}$: $4^1*2^6 = 256$<br>max: 31, c: 1, times: 3.47 |
| $W_k[7]$ | $BWMAC_{07}$, $w_{07}$: $-4^0*2^7 = -128$<br>max: 31, c: 1, times: 5 | $BWMAC_{17}$, $w_{17}$: $-4^1*2^7 = -512$<br>max: 31, c: 1, times: 5 |

TABLE 6

| | Case III (second part) | |
|---|---|---|
| nacc: 16 | | |
| Wc: 8 | | |
| Ic: 8 | $IN_k[5:4]$ | $IN_k[7:6]$ |
| $W_k[0]$ | $BWMAC_{20}$, $w_{20}$: $4^2*2^0 = 16$<br>max: 15, c: 2, times: 3 | $BWMAC_{30}$, $w_{30}$: $4^3*2^0 = 64$<br>max: 31, c: 2, times: 3.47 |
| $w_k[1]$ | $BWMAC_{21}$, $w_{21}$: $4^2*2^1 = 32$<br>max: 15, c: 2, times: 2 | $BWMAC_{31}$, $w_{31}$: $4^3*2^1 = 128$<br>max: 31, c: 2, times: 3.47 |
| $W_k[2]$ | $BWMAC_{22}$, $w_{22}$: $4^2*2^2 = 64$<br>max: 31, c: 2, times: 3.47 | $BWMAC_{32}$, $w_{32}$: $4^3*2^2 = 256$<br>max: 31, c: 2, times: 3.47 |
| $W_k[3]$ | $BWMAC_{23}$, $w_{23}$: $4^2*2^3 = 128$<br>max: 31, c: 2, times: 3.47 | $BWMAC_{33}$, $w_{33}$: $4^3*2^3 = 512$<br>max: 31, c: 1, times: 5 |
| $W_k[4]$ | $BWMAC_{24}$, $w_{24}$: $4^2*2^4 = 256$<br>max: 31, c: 2, times: 3.47 | $BWMAC_{34}$, $w_{34}$: $4^3*2^4 = 1024$<br>max: 31, c: 1, times: 5 |
| $W_k[5]$ | $BWMAC_{25}$, $w_{25}$: $4^2*2^5 = 512$<br>max: 31, c: 1, times: 5 | $BWMAC_{35}$, $w_{35}$: $4^3*2^5 = 2048$<br>max: 31, c: 1, times: 5 |
| $W_k[6]$ | $BWMAC_{26}$, $w_{26}$: $4^2*2^6 = 1024$<br>max: 31, c: 1, times: 5 | $BWMAC_{36}$, $w_{36}$: $4^3*2^6 = 4096$<br>max: 31, c: 1, times: 5 |
| $W_k[7]$ | $BWMAC_{27}$, $w_{27}$: $-4^2*2^7 = -2048$<br>max: 31, c: 1, times: 5 | $BWMAC_{37}$, $w3_7$: $-4^3*2^7 = -8192$<br>max: 31, c: 1, times: 5 |

Table 7 lists accuracy values of Case I, Case II and Case III of the dynamic gradient calibration method 100a, 100b for the CIM neural network of the present disclosure. "DGCNN" represents a dynamic gradient calibration neural network and is corresponding to the confidence considering step S224 of the forward operating step S22 of the dynamic gradient calibration method 100b of FIG. 14.

TABLE 7

| Data set | Model | In/W bits | Case | Best acc | Average acc | Worst acc | Read out bits |
|---|---|---|---|---|---|---|---|
| Cifar10 | Resnet20 | 4/8 | Benchmark | 92.48 | 92.25 | 92.06 | 96 |
| Cifar10 | Resnet20 | 4/8 | Case I | 92.13 | 91.85 | 91.48 | 53.6 |
| Cifar10 | Resnet20 | 4/8 | Case I DGCNN | 92.44 | 92.22 | 92.02 | 53.6 |
| Cifar10 | Resnet20 | 4/8 | Case II | 92.35 | 92.135 | 91.94 | 51.6 |
| Cifar10 | Resnet20 | 4/8 | Case II DGCNN | 92.46 | 92.26 | 92.03 | 51.6 |
| Cifar10 | Resnet20 | 8/8 | Benchmark | 92.63 | 92.4 | 92.2 | 192 |
| Cifar10 | Resnet20 | 8/8 | Case III | 92.47 | 92.31 | 92.05 | 114.7 |
| Cifar10 | Resnet20 | 8/8 | Case III DGCNN | 92.6 | 92.38 | 92.23 | 114.7 |

Figure 16:
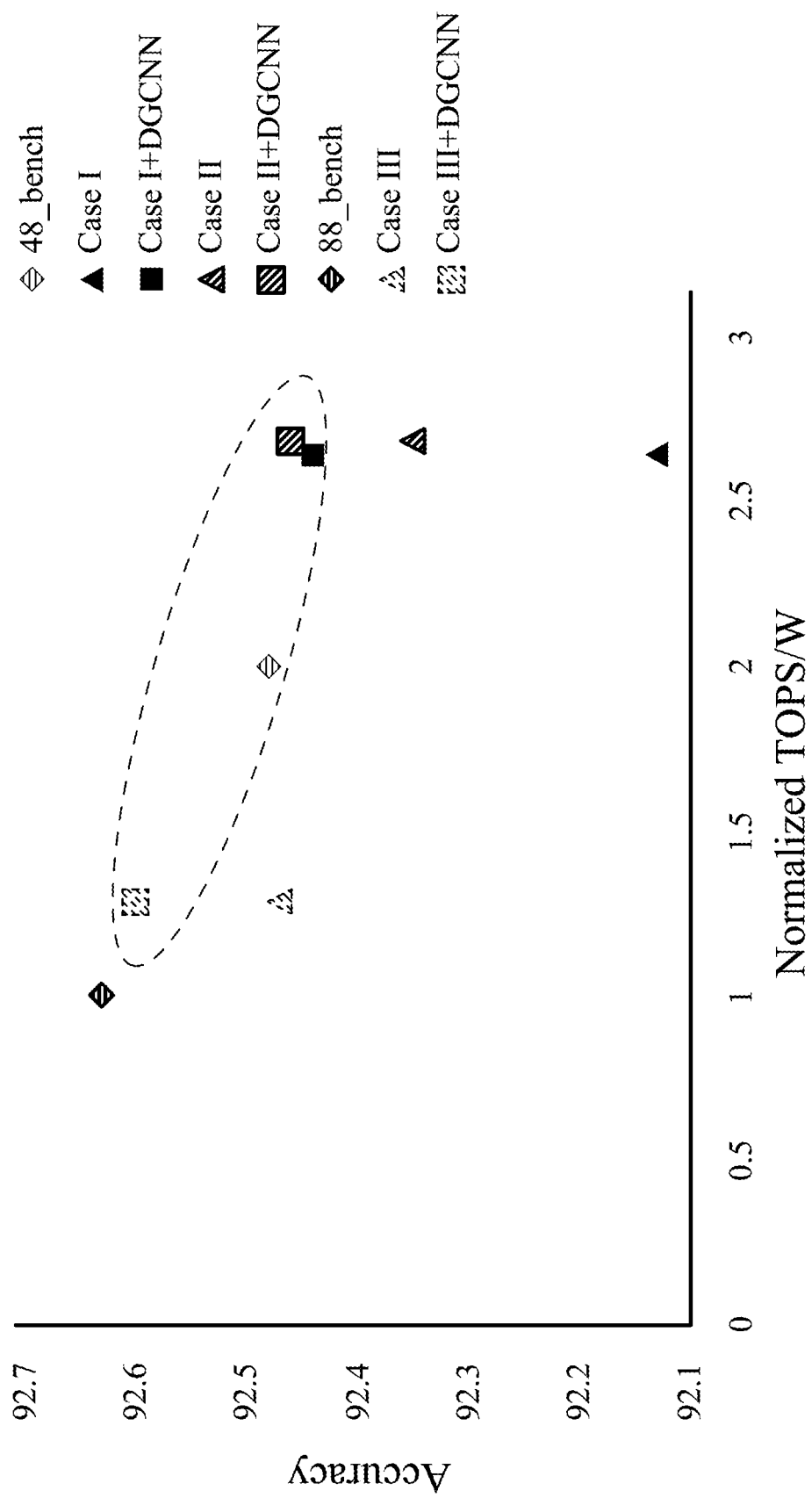
FIG. 16 shows an accuracy position chart relative to normalized tera operations per second per watt (TOPS/W) of the present disclosure and the conventional method.

Please refer to FIG. 16. FIG. 16 shows an accuracy position chart relative to normalized tera operations per second per watt (TOPS/W) of the present disclosure and the conventional method (i.e., 48_bench, 88_bench). "48_bench" represents the benchmark with 4-bit inputs and 8-bit weights (i.e., In/W bit=4/8, and Case=Benchmark in Table 7). "88_bench" represents the benchmark with 8-bit inputs and 8-bit weights (i.e., In/W bit=8/8, and Case=Benchmark in Table 7). In FIG. 16, the accuracy values are corresponding to "Best acc" in Table 7. In "Case I", the accuracy value is dropped by 0.35. In "Case I+DGCNN", the accuracy value is only dropped by 0.04. In "Case II", the accuracy value is dropped by 0.13. In "Case II+DGCNN", the accuracy value is only dropped by 0.02. In "Case III", the accuracy value is dropped by 0.16. In "Case III+DGCNN", the accuracy value is only dropped by 0.03. Moreover, in "Case I" and "Case I+DGCNN", normalized TOPS/W can be improved by 1.32×. In "Case II" and "Case II+DGCNN", normalized TOPS/W can be improved by 1.34×. In "Case III" and "Case III+DGCNN", normalized TOPS/W can be improved by 1.29×. In other words, normalized TOPS/W of the present disclosure can be improved by 1.29×-1.34×. Therefore, the dynamic gradient calibration method 100a, 100b for the CIM neural network of the present disclosure can utilize specific processes (e.g., BFWB, HBWQNN and DGCNN) to drastically reduce power consumption without affecting the accuracy of the CIM neural network, so that it is suitable for the CIM neural network.

Figure 17:
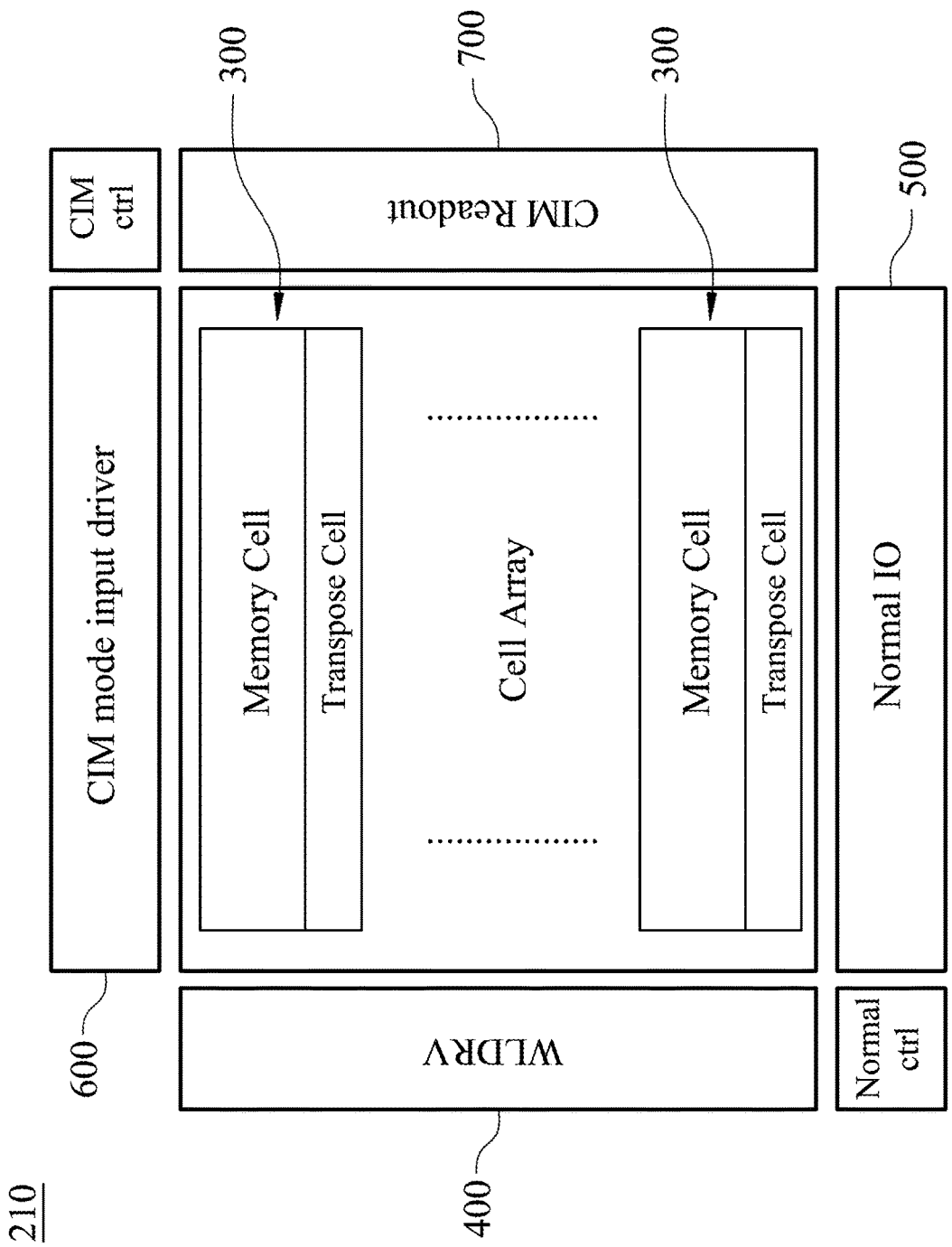
FIG. 17 shows a block diagram of a CIM circuit of the system of FIG. 2.
Figure 18:
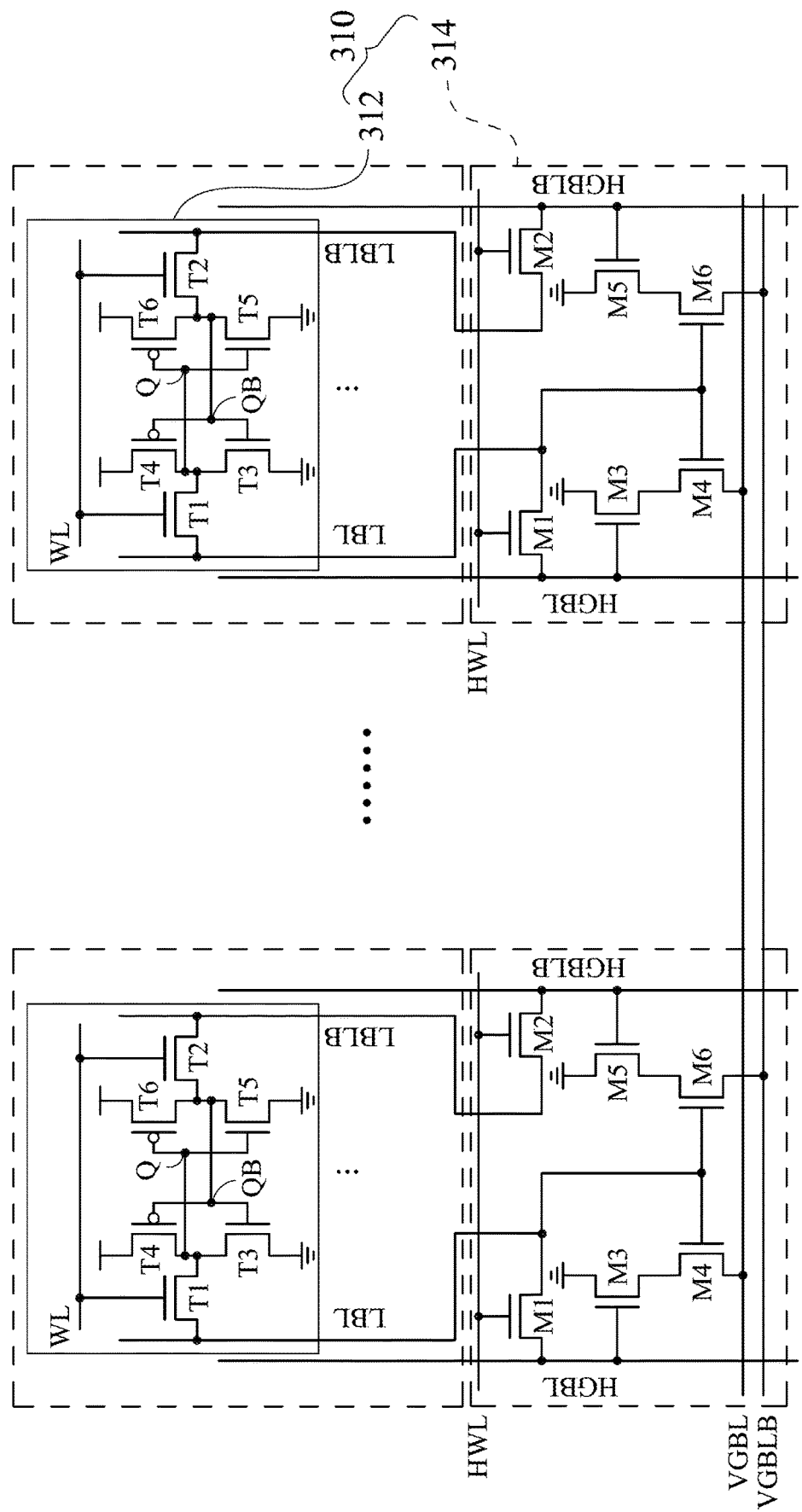
FIG. 18 shows a circuit diagram of a plurality of memory units of the CIM circuit of FIG. 17.
Figure 19:
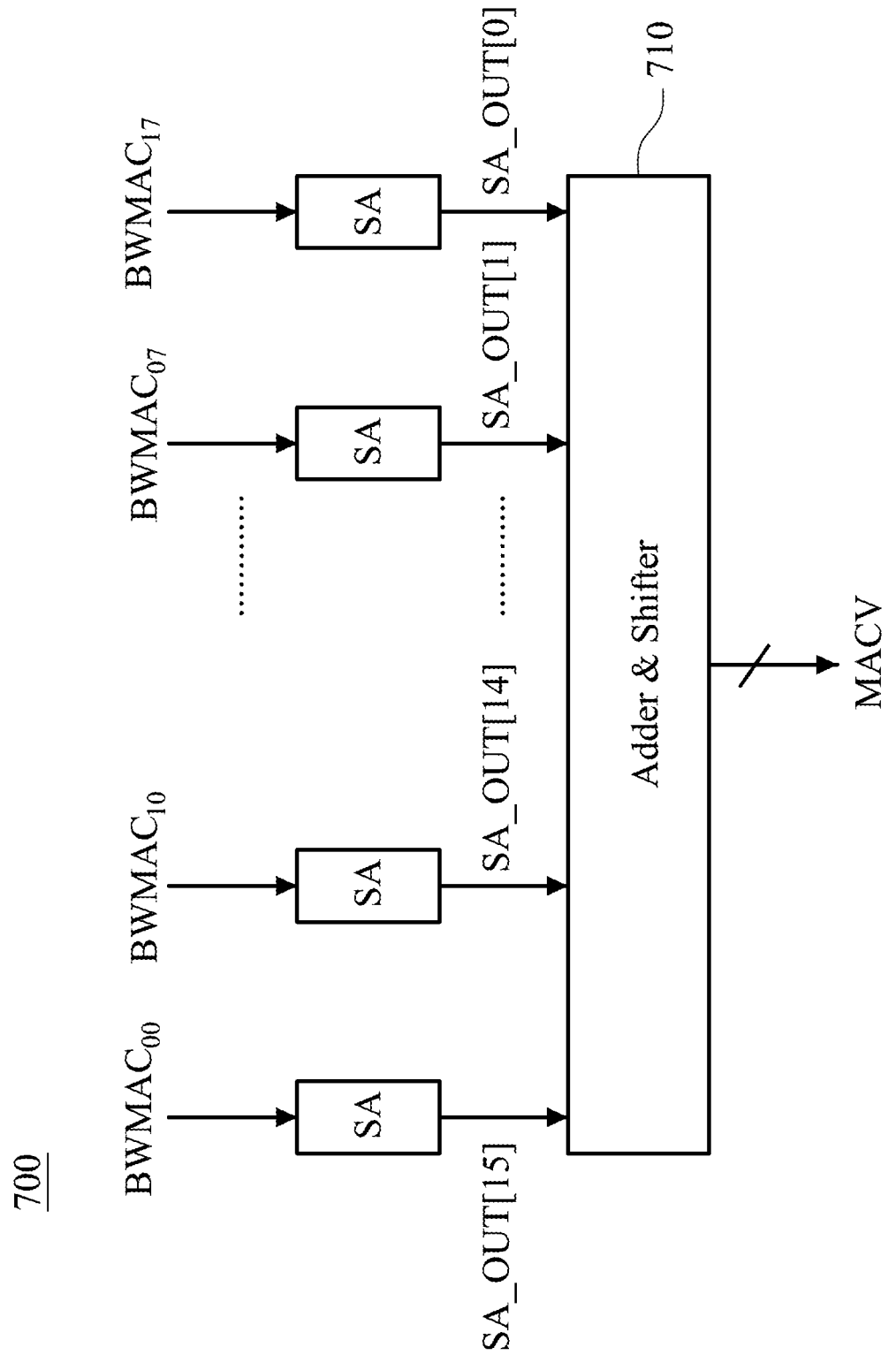
FIG. 19 shows a block diagram of a CIM readout circuit of the CIM circuit of FIG. 17.

Please refer to FIGS. 2 and 17-19. FIG. 17 shows a block diagram of a CIM circuit 210 of the system 200 of FIG. 2. FIG. 18 shows a circuit diagram of a plurality of memory units of the CIM circuit 210 of FIG. 17. FIG. 19 shows a block diagram of a CIM readout circuit 700 of the CIM circuit 210 of FIG. 17. The system 200 may be applied to a plurality of dynamic gradient calibration methods 100, 100a, 100b for a CIM neural network. The system 200 of one of the dynamic gradient calibration methods 100, 100a, 100b for the CIM neural network is configured to update a plurality of weights according to a plurality of inputs corresponding to a correct answer. The system 200 includes the CIM circuit 210, a processor 220 and a memory 230.

The CIM circuit 210 is controlled by a first word line WL and a second word line HWL. The CIM circuit 210 stores the weights and receives the inputs. The CIM circuit 210 includes a plurality of local memory array units 300, a word line driver 400, a normal input-output (IO) circuit 500, a CIM mode input driver 600 and a CIM readout circuit 700.

The local memory array units 300 are connected to each other. Each of the local memory array units 300 includes the memory units 310. The memory units 310 are connected to each other via the first word line WL and the second word line HWL. Each of the memory units 310 includes a plurality of memory cell 312 and a transpose cell 314.

The memory cell 312 stores a weight (1-bit weight). The memory cell 312 is controlled by the first word line WL. In detail, the memory cell 312 includes a first node Q, a second node QB, a local bit line LBL, a local bit line bar LBLB, a first memory cell transistor T1, a second memory cell transistor T2, a first inverter INV1 and a second inverter INV2. The first node Q stores the weight. The second node QB stores an inverted weight opposite to the weight of the first node Q. The local bit line LBL is connected to the transpose cell 314 and transmits the weight from the memory cell 312 to the transpose cell 314. The local bit line bar LBLB is connected to the transpose cell 314 and transmits the inverted weight from the memory cell 312 to the transpose cell 314. The first memory cell transistor T1 is connected to the first node Q, the local bit line LBL and the first word line WL. The second memory cell transistor T2 is connected to the second node QB, the local bit line bar LBLB and the first word line WL. The first inverter INV1 is located between the first node Q and the second node QB. The first inverter INV1 includes a third memory cell transistor T3 and a fourth memory cell transistor T4 connected to the third memory cell transistor T3. The second inverter INV2 is connected to the first inverter INV1. The second inverter INV2 includes a fifth memory cell transistor T5 and a sixth memory cell transistor T6 connected to the fifth memory cell transistor T5. In other words, the memory cell 312 is a 6T static random access memory (SRAM) cell. Each of the first memory cell transistor T1, the second memory cell transistor T2, the third memory cell transistor T3 and the fifth memory cell transistor T5 is the NMOS transistor. Each of the fourth memory cell transistor T4 and the sixth memory cell transistor T6 is the PMOS transistor.

The transpose cell 314 is connected to the memory cell 312 and receives the weight via the local bit line LBL. The transpose cell 314 includes an input bit line HGBL, an input bit line bar HGBLB, an output bit line VGBL and an output bit line bar VGBLB. Each of the input bit line HGBL and the input bit line bar HGBLB transmits the input, and the transpose cell 314 is controlled by the second word line HWL to generate a multi-bit output value on each of the output bit line VGBL and the output bit line bar VGBLB according to the input multiplied by the weight. In detail, the input of the input bit line HGBL is $V_{MSB}$ corresponding to the inputs $IN_k[3:2]$, and the input of the input bit line bar HGBLB is $V_{LSB}$ corresponding to the inputs $IN_k[1:0]$. The transpose cell 314 includes a first transpose cell transistor M1, a second transpose cell transistor M2, a third transpose cell transistor M3, a fourth transpose cell transistor M4, a fifth transpose cell transistor M5 and a sixth transpose cell transistor M6. The first transpose cell transistor M1 is connected to the second word line HWL, the input bit line HGBL and the local bit line LBL. The second transpose cell transistor M2 is connected to the second word line HWL, the input bit line bar HGBLB and the local bit line bar LBLB. The third transpose cell transistor M3 is connected to the ground voltage, the input bit line HGBL and a third node. The fourth transpose cell transistor M4 is connected to the third node, the local bit line LBL and the output bit line VGBL. The fifth transpose cell transistor M5 is connected to the ground voltage, the input bit line bar HGBLB and a fourth node. The sixth transpose cell transistor M6 is connected to the fourth node, the local bit line LBL and the output bit line bar VGBLB. In addition, the input is an analog signal. The input bit line HGBL and the input bit line bar HGBLB are extended in a vertical direction (column). The first word line WL, the second word line HWL, the output bit line VGBL and the output bit line bar VGBLB are extended in a horizontal direction (row). Each of the first transpose cell transistor M1, the second transpose cell transistor M2, the third transpose cell transistor M3, the fourth transpose cell transistor M4, the fifth transpose cell transistor M5 and the sixth transpose cell transistor M6 is the NMOS transistor.

The word line driver 400 is connected to each of the local memory array units 300 via the first word line WL and the second word line HWL. The word line driver 400 is represented by "WLDRV" and is located on a left side of the local memory array units 200. The word line driver 400 generates the voltage level of the first word line WL and the voltage level of the second word line HWL to control each of the local memory array units 300.

The normal IO circuit 500 is connected to each of the local memory array units 300 via the input bit line HGBL and the input bit line bar HGBLB. The normal IO circuit 500 is represented by "Normal IO" and is located on a bottom side of the local memory array units 300. The normal IO circuit 500 receives the weights from the local memory array units 300.

The CIM mode input driver 600 is connected to each of the local memory array units 300 via the input bit line HGBL and the input bit line bar HGBLB. The CIM mode input driver 600 is located on a top side of the local memory array units 300. The CIM mode input driver 600 generates the voltage level of the input bit line HGBL and the voltage level of the input bit line bar HGBLB according to the inputs ($IN_k[3:2]$ and $IN_k[1:0]$), respectively.

The CIM readout circuit 700 is connected to each of the local memory array units 300 via the output bit line VGBL and the output bit line bar VGBLB. The CIM readout circuit 700 is represented by "CIM Readout" and is located on a right side of the local memory array units 300. The CIM readout circuit 700 receives the multi-bit output values (e.g., $BWMAC_{00}$-$BWMAC_{17}$) from the local memory array units 300. In detail, the CIM readout circuit 700 includes a plurality of sense amplifiers SA and at least one adder-shifter circuit 710. In one embodiment of FIG. 19, the number of the sense amplifiers SA may be equal to 16, and the number of the at least one adder-shifter circuit 710 may be equal to 1. The sense amplifiers SA are connected to the output bit line VGBL and the output bit line bar VGBLB. Each of the sense amplifiers SA receives the multi-bit output value from one of the output bit line VGBL and the output bit line bar VGBLB, and each of the sense amplifiers SA transfers the multi-bit output value (e.g., $BWMAC_{17}$) to a multi-bit digital output value (e.g., SA_OUT[0]). In addition, the adder-shifter circuit 710 is represented by "Adder & Shifter" and is connected to the sense amplifiers SA. The adder-shifter circuit 710 is configured to add and shift the multi-bit digital output values (SA_OUT[0]-SA_OUT[15]) of the sense amplifiers to generate the multiply-accumulate value MACV.

The memory 230 stores the correct answer. The processor 220 is signally connected between the CIM circuit 210 and the memory 230. The processor 220 is configured to implement one of the dynamic gradient calibration methods 100, 100a, 100b for the CIM neural network. The processor 220 may be a computer, a microprocessor or a mobile device, but the present disclosure is not limited thereto. Accordingly, the system 200 of the present disclosure can effectively accomplish the dynamic gradient calibration methods 100, 100a, 100b for the CIM neural network.

According to the aforementioned embodiments and examples, the advantages of the present disclosure are described as follows.

1. The dynamic gradient calibration method for the CIM neural network of the present disclosure can utilize BFWB and the clamping step to drastically reduce power consumption without affecting the accuracy of the CIM neural network. BFWB can skip a non-differentiable function, and the clamping step can improve margin, so that it is suitable for the CIM neural network.

2. The dynamic gradient calibration method for the CIM neural network of the present disclosure utilizes HBWQNN with adaptive sensing times of the bit wise multiply-accumulate values in the quantization function to change the readout precision so as to drastically reduce power consumption without affecting the accuracy of the CIM neural network.

3. The dynamic gradient calibration method for the CIM neural network of the present disclosure can utilize DGCNN to greatly improve the accuracy of the CIM neural network.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A dynamic gradient calibration method for a computing-in-memory neural network, which is performed to update a plurality of weights in a computing-in-memory circuit according to a plurality of inputs corresponding to a correct answer, and the dynamic gradient calibration method comprising:

performing a forward operating step, wherein the forward operating step comprises:
    performing a bit wise multiply-accumulate step, wherein the bit wise multiply-accumulate step comprises dividing each of the inputs into a plurality of divided inputs, dividing each of the weights into a plurality of divided weights, and performing a bit wise multiply-accumulate operation on the divided inputs and the divided weights to generate a plurality of multiply-accumulate values;
    performing a clamping step, wherein the clamping step comprises obtaining a predetermined upper bound value and a predetermined lower bound value, and performing a clamping function on the multiply-accumulate values to generate a plurality of clamped multiply-accumulate values according to the predetermined upper bound value and the predetermined lower bound value, and each of the clamped multiply-accumulate values is between the predetermined upper bound value and the predetermined lower bound value; and performing a comparing step, wherein the comparing step comprises comparing the clamped multiply-accumulate values with the correct answer to generate a plurality of loss values; and performing a backward operating step, wherein the backward operating step comprises:

performing a partial differential operating step, wherein the partial differential operating step comprises performing a partial differential operation on the loss values relative to the weights to generate a plurality of weight-based gradients, and the weights are updated according to the weight-based gradients;

wherein the computing-in-memory circuit comprises a plurality of memory units, and each of the memory units comprises:

at least one memory cell storing one of the weights, wherein the at least one memory cell is controlled by a first word line and comprises a local bit line transmitting the one of the weights; and a transpose cell connected to the at least one memory cell and receiving the one of the weights via the local bit line, wherein the transpose cell comprises at least one input bit line, at least one input bit line bar, an output bit line and an output bit line bar, each of the at least one input bit line and the at least one input bit line bar transmits at least one multi-bit input value corresponding to the inputs, and the transpose cell is controlled by a second word line to generate a multi-bit output value on each of the output bit line and the output bit line bar according to the at least one multi-bit input value multiplied by the one of the weights.

2. The dynamic gradient calibration method for the computing-in-memory neural network of claim 1, wherein the bit wise multiply-accumulate operation comprises:

calculating the divided inputs and the divided weights according to a convolution calculation to generate a plurality of bit wise multiply-accumulate values, and then performing an analog-to-digital conversion on the bit wise multiply-accumulate values to generate a plurality of digital bit wise multiply-accumulate values; and weighting and combining the digital bit wise multiply-accumulate values to generate the multiply-accumulate values.

3. The dynamic gradient calibration method for the computing-in-memory neural network of claim 2, wherein one of the multiply-accumulate values is calculated by a sign function, a plurality of variable factors, the divided inputs and the divided weights, the sign function is represented as sign, the variable factors are represented as i, j, k, respectively, the divided inputs are represented as $IN_k$, the divided weights are represented as $W_k$, and the one of the multiply-accumulate values is represented as MACV and described as follows:

$$MACV = \Sigma_{i=0}^{1} \Sigma_{j=0}^{7} sign * 2^{j} * 4^{i} * (\Sigma_{k=0}^{15} IN_k[i*2 + 1:i*2] * W_k[j]).$$

4. The dynamic gradient calibration method for the computing-in-memory neural network of claim 1, wherein the clamping function comprises:

setting the clamped multiply-accumulate values to multiply-accumulate values, respectively; and in response to determining that one of the clamped multiply-accumulate values is greater than the predetermined upper bound value, setting the one of the clamped multiply-accumulate values to the predetermined upper bound value;

wherein the multiply-accumulate values have a maximum value and a minimum value, the predetermined upper bound value is greater than the minimum value and smaller than the maximum value, and the predetermined lower bound value is equal to the minimum value.

5. The dynamic gradient calibration method for the computing-in-memory neural network of claim 1, wherein the bit wise multiply-accumulate step further comprises:

performing a splitting step, wherein the splitting step comprises performing a split function on the weights and the inputs so as to divide each of the inputs into the divided inputs and divide each of the weights into the divided weights.

6. The dynamic gradient calibration method for the computing-in-memory neural network of claim 1, wherein the partial differential operating step further comprises:

performing the partial differential operation on the loss values relative to the clamped multiply-accumulate values to generate an output-based gradient; and performing the partial differential operation on the loss values relative to performing the partial differential operation on the loss values relative to the inputs to generate a plurality of input-based gradients.

7. A dynamic gradient calibration method for a computing-in-memory neural network, which is performed to update a plurality of weights in a computing-in-memory circuit according to a plurality of inputs corresponding to a correct answer, and the dynamic gradient calibration method comprising:

performing a forward operating step, wherein the forward operating step comprises:

performing a bit wise multiply-accumulate step, wherein the bit wise multiply-accumulate step comprises dividing each of the inputs into a plurality of divided inputs, dividing each of the weights into a plurality of divided weights, and performing a bit wise multiply-accumulate operation on the divided inputs and the divided weights to generate a plurality of multiply-accumulate values;

performing a clamping step, wherein the clamping step comprises obtaining a predetermined upper bound value and a predetermined lower bound value, and performing a clamping function on the multiply-accumulate values to generate a plurality of clamped multiply-accumulate values according to the predetermined upper bound value and the predetermined lower bound value, and each of the clamped multiply-accumulate values is between the predetermined upper bound value and the predetermined lower bound value;

performing a quantization step, wherein the quantization step comprises performing a quantization function on the clamped multiply-accumulate values to generate a plurality of quantized multiply-accumulate values; and performing a comparing step, wherein the comparing step comprises comparing the quantized multiply-accumulate values with the correct answer to generate a plurality of loss values; and performing a backward operating step, wherein the backward operating step comprises:

performing a partial differential operating step, wherein the partial differential operating step comprises performing a partial differential operation on the loss values relative to the weights to generate a plurality of weight-based gradients, and the weights are updated according to the weight-based gradients;

wherein the computing-in-memory circuit comprises a plurality of memory units, and each of the memory units comprises:

at least one memory cell storing one of the weights, wherein the at least one memory cell is controlled by a first word line and comprises a local bit line transmitting the one of the weights; and a transpose cell connected to the at least one memory cell and receiving the one of the weights via the local bit line, wherein the transpose cell comprises at least one input bit line, at least one input bit line bar, an output bit line and an output bit line bar, each of the at least one input bit line and the at least one input bit line bar transmits at least one multi-bit input value corresponding to the inputs, and the transpose cell is controlled by a second word line to generate a multi-bit output value on each of the output bit line and the output bit line bar according to the at least one multi-bit input value multiplied by the one of the weights.

8. The dynamic gradient calibration method for the computing-in-memory neural network of claim 7, wherein the quantization function is an integer linear quantization function, the integer linear quantization function is calculated by a Gauss function and a merged value, the merged value represents a number of a plurality of values merged into a local minimum value, the integer linear quantization function is represented as quantize$_{IL}$, the Gauss function is represented as G, the merged value is represented as c, the clamped multiply-accumulate values are represented as Z', and the quantized multiply-accumulate values are represented as Z'' and described as follows:

$$Z''=\text{quantize}_{IL}(Z',c)=c \times G(Z'/c).$$

9. The dynamic gradient calibration method for the computing-in-memory neural network of claim 7, wherein the forward operating step further comprises:

performing a confidence considering step, wherein the confidence considering step comprises calculating a weight bit number, an input bit number and a confidence factor to generate a confidence rate, the confidence factor is configured to decide whether or not one of the quantized multiply-accumulate values is correspondingly equal to one of the multiply-accumulate values, the weight bit number is represented as Wc, the input bit number is represented as Ic, the confidence factor is represented as ori, and the confidence rate is represented as c_ratio and described as follows:

$$c\_ratio=(\Sigma_{j=0}^{Ic/2-1}\Sigma_{j=0}^{Wc-1}2^{j}*4^{i})/(\Sigma_{j=0}^{Ic/2-1}\Sigma_{j=0}^{Wc-1}2^{j}*4^{i}*ori);$$

wherein in response to determining that the one of the quantized multiply-accumulate values is correspondingly equal to the one of the multiply-accumulate values, the confidence factor is equal to 1; and in response to determining that the one of the quantized multiply-accumulate values is correspondingly different from the one of the multiply-accumulate values, the confidence factor is equal to 0.

10. The dynamic gradient calibration method for the computing-in-memory neural network of claim 7, wherein the bit wise multiply-accumulate operation comprises:

calculating the divided inputs and the divided weights according to a convolution calculation to generate a plurality of bit wise multiply-accumulate values, and then performing an analog-to-digital conversion on the bit wise multiply-accumulate values to generate a plurality of digital bit wise multiply-accumulate values; and weighting and combining the digital bit wise multiply-accumulate values to generate the multiply-accumulate values.

11. The dynamic gradient calibration method for the computing-in-memory neural network of claim 10, wherein one of the multiply-accumulate values is calculated by a sign function, a plurality of variable factors, the divided inputs and the divided weights, the sign function is represented as sign, the variable factors are represented as i, j, k, respectively, the divided inputs are represented as $IN_k$, the divided weights are represented as $W_k$, and the one of the multiply-accumulate values is represented as MACV and described as follows:

$$MACV=\Sigma_{i=0}^{1}\Sigma_{j=0}^{7} \text{sign}*2^{j}*4^{i}*(\Sigma_{k=0}^{15}IN_k[i*2+1:i*2]*W_k[j]).$$

12. The dynamic gradient calibration method for the computing-in-memory neural network of claim 6, wherein the clamping function comprises:

setting the clamped multiply-accumulate values to the multiply-accumulate values, respectively; and in response to determining that one of the clamped multiply-accumulate values is greater than the predetermined upper bound value, setting the one of the clamped multiply-accumulate values to the predetermined upper bound value;

wherein the multiply-accumulate values have a maximum value and a minimum value, the predetermined upper bound value is greater than the minimum value and smaller than the maximum value, and the predetermined lower bound value is equal to the minimum value.

13. The dynamic gradient calibration method for the computing-in-memory neural network of claim 6, wherein the bit wise multiply-accumulate step further comprises:

performing a splitting step, wherein the splitting step comprises performing a split function on the weights and the inputs so as to divide each of the inputs into the divided inputs and divide each of the weights into the divided weights.

14. The dynamic gradient calibration method for the computing-in-memory neural network of claim 6, wherein the partial differential operating step further comprises:

performing the partial differential operation on the loss values relative to the clamped multiply-accumulate values to generate an output-based gradient; and performing the partial differential operation on the loss values relative to the inputs to generate a plurality of input-based gradients.

15. A system of a dynamic gradient calibration method for a computing-in-memory neural network, which is configured to update a plurality of weights according to a plurality of inputs corresponding to a correct answer, and the system comprising:

a computing-in-memory circuit storing the weights and receiving the inputs;

a memory storing the correct answer; and a processor signally connected between the computing-in-memory circuit and the memory and configured to implement the dynamic gradient calibration method for the computing-in-memory neural network comprising:

performing a forward operating step, wherein the forward operating step comprises:

performing a bit wise multiply-accumulate step, wherein the bit wise multiply-accumulate step comprises dividing each of the inputs into a plurality of divided inputs, dividing each of the weights into a plurality of divided weights, and performing a bit wise multiply-accumulate operation on the divided inputs and the divided weights to generate a plurality of multiply-accumulate values;

performing a clamping step, wherein the clamping step comprises obtaining a predetermined upper bound value and a predetermined lower bound value, and performing a clamping function on the multiply-accumulate values to generate a plurality of clamped multiply-accumulate values according to the predetermined upper bound value and the predetermined lower bound value, and each of the clamped multiply-accumulate values is between the predetermined upper bound value and the predetermined lower bound value;

performing a quantization step, wherein the quantization step comprises performing a quantization function on the clamped multiply-accumulate values to generate a plurality of quantized multiply-accumulate values; and performing a comparing step, wherein the comparing step comprises comparing the quantized multiply-accumulate values with the correct answer to generate a plurality of loss values; and performing a backward operating step, wherein the backward operating step comprises:

performing a partial differential operating step, wherein the partial differential operating step comprises performing a partial differential operation on the loss values relative to the weights to generate a plurality of weight-based gradients, and the weights are updated according to the weight-based gradients;

wherein the computing-in-memory circuit comprises a plurality of memory units, and each of the memory units comprises:

at least one memory cell storing one of the weights, wherein the at least one memory cell is controlled by a first word line and comprises a local bit line transmitting the one of the weights; and a transpose cell connected to the at least one memory cell and receiving the one of the weights via the local bit line, wherein the transpose cell comprises at least one input bit line, at least one input bit line bar, an output bit line and an output bit line bar, each of the at least one input bit line and the at least one input bit line bar transmits at least one multi-bit input value corresponding to the inputs, and the transpose cell is controlled by a second word line to generate a multi-bit output value on each of the output bit line and the output bit line bar according to the at least one multi-bit input value multiplied by the one of the weights.

16. The system of claim 15, wherein the quantization function is an integer linear quantization function, the integer linear quantization function is calculated by a Gauss function and a merged value, the merged value represents a number of a plurality of values merged into a local minimum value, the integer linear quantization function is represented as quantize L, the Gauss function is represented as G, the merged value is represented as c, the clamped multiply-accumulate values are represented as $Z'$, and the quantized multiply-accumulate values are represented as $Z''$ and described as follows:

$$Z''=\text{quantize}_{IL}(Z',c)=c \times G(Z'/c).$$

17. The system of claim 15, wherein the forward operating step further comprises:

performing a confidence considering step, wherein the confidence considering step comprises calculating a weight bit number, an input bit number and a confidence factor to generate a confidence rate, the confidence factor is configured to decide whether or not one of the quantized multiply-accumulate values is correspondingly equal to one of the multiply-accumulate values, the weight bit number is represented as We, the input bit number is represented as Ic, the confidence factor is represented as ori, and the confidence rate is represented as c_ratio and described as follows:

$$c\_ratio = (\sum_{i=0}^{Ic/2-1} \sum_{j=0}^{Wc-1} 2^j * 4^i) / (\sum_{i=0}^{Ic/2-1} \sum_{j=0}^{Wc-1} 2^j * 4^i * ori);$$

wherein in response to determining that the one of the quantized multiply-accumulate values is correspondingly equal to the one of the multiply-accumulate values, the confidence factor is equal to 1; and in response to determining that the one of the quantized multiply-accumulate values is correspondingly different from the one of the multiply-accumulate values, the confidence factor is equal to 0.

18. The system of claim 15, wherein the bit wise multiply-accumulate operation comprises:

calculating the divided inputs and the divided weights according to a convolution calculation to generate a plurality of bit wise multiply-accumulate values, and then performing an analog-to-digital conversion on the bit wise multiply-accumulate values to generate a plurality of digital bit wise multiply-accumulate values; and weighting and combining the digital bit wise multiply-accumulate values to generate the multiply-accumulate values.

19. The system of claim 15, wherein the clamping function comprises:

setting the clamped multiply-accumulate values to the multiply-accumulate values, respectively; and in response to determining that one of the clamped multiply-accumulate values is greater than the predetermined upper bound value, setting the one of the clamped multiply-accumulate values to the predetermined upper bound value;

wherein the multiply-accumulate values have a maximum value and a minimum value, the predetermined upper bound value is greater than the minimum value and smaller than the maximum value, and the predetermined lower bound value is equal to the minimum value.

20. The system of claim 15, wherein the bit wise multiply-accumulate step further comprises:

performing a splitting step, wherein the splitting step comprises performing a split function on the weights and the inputs so as to divide each of the inputs into the divided inputs and divide each of the weights into the divided weights.

* * * * *